(12) United States Patent
Bozic

(10) Patent No.: US 12,061,180 B2
(45) Date of Patent: Aug. 13, 2024

(54) GAS-LIQUID SEPARATOR FOR A CHROMATOGRAPHY SYSTEM

(71) Applicant: Alexander Bozic, Oberursel (DE)

(72) Inventor: Alexander Bozic, Oberursel (DE)

( * ) Notice: Subject to any disclaimer, the term of this patent is extended or adjusted under 35 U.S.C. 154(b) by 0 days.

(21) Appl. No.: 18/063,128

(22) Filed: Dec. 8, 2022

(65) Prior Publication Data

US 2023/0109230 A1 Apr. 6, 2023

Related U.S. Application Data

(62) Division of application No. 16/613,850, filed as application No. PCT/EP2018/062537 on May 15, 2018, now Pat. No. 11,549,923.

(30) Foreign Application Priority Data

May 16, 2017 (DE) .......................... 102017110601.4
Nov. 6, 2017 (DE) .......................... 102017125816.7
Dec. 20, 2017 (DE) .......................... 102017130820.2

(51) Int. Cl.
*G01N 30/84* (2006.01)
*B01D 15/40* (2006.01)
(Continued)

(52) U.S. Cl.
CPC ............. *G01N 30/84* (2013.01); *B01D 15/40* (2013.01); *B01D 45/08* (2013.01); *G01N 30/06* (2013.01);
(Continued)

(58) Field of Classification Search
CPC ........ G01N 30/84; G01N 30/06; G01N 30/80; G01N 2030/065; B01D 15/40; B01D 45/08
See application file for complete search history.

(56) References Cited

U.S. PATENT DOCUMENTS 1,756,288 A * 4/1930 Gray .................. B01D 19/0042
96/168
2,732,033 A * 1/1956 Parks ..................... B01D 45/08
55/391
(Continued)

FOREIGN PATENT DOCUMENTS

CN 104470609 A 3/2015
EP 2463004 A1 6/2012
(Continued)

OTHER PUBLICATIONS

Search Report in International Application No. PCT/EP2018/062537 dated Aug. 28, 2018, 5 pages.
(Continued)

*Primary Examiner* — Dung H Bui
(74) *Attorney, Agent, or Firm* — MARSHALL, GERSTEIN & BORUN LLP

(57) ABSTRACT

The present invention relates to a gas-liquid separator for a chromatography system, comprising:
(a) a separating region having an inlet nozzle, a baffle unit and a gas distribution unit;
(b) a dividing region having a liquid outlet; and
(c) a gas discharge region having a gas outlet;
wherein the separating region is connected to the dividing region by a separating opening and the distance of the inlet nozzle from the baffle unit is greater than the smallest longitudinal extension of the separating opening and the inlet nozzle is configured such that a gas-liquid stream directed through the inlet nozzle can act on the baffle unit.
The present invention further relates to a chromatography system comprising a separator according to the invention and to a chromatography method wherein the separator is used.

17 Claims, 9 Drawing Sheets

(51) Int. Cl.
  *B01D 45/08*   (2006.01)
  *G01N 30/06*   (2006.01)
  *G01N 30/80*   (2006.01)

(52) U.S. Cl.
  CPC ....... *G01N 2030/065* (2013.01); *G01N 30/80* (2013.01)

(56) References Cited

U.S. PATENT DOCUMENTS

| | | | | |
|---|---|---|---|---|
| 3,507,098 | A | * | 4/1970 | Veres .................... F22B 37/265 |
| | | | | 251/35 |
| 4,270,934 | A | * | 6/1981 | Widdowson ........... B01D 45/08 |
| | | | | 62/503 |
| 2011/0024124 | A1 | * | 2/2011 | Brown ............... B01D 19/0052 |
| | | | | 166/357 |
| 2011/0185892 | A1 | | 8/2011 | Smith |
| 2013/0186831 | A1 | * | 7/2013 | Sidhu .................... B01D 15/10 |
| | | | | 210/656 |
| 2015/0174508 | A1 | | 6/2015 | Bozic |

FOREIGN PATENT DOCUMENTS

| | | |
|---|---|---|
| JP | 2015-527929 A | 9/2015 |
| WO | WO-2012040252 A2 | 3/2012 |
| WO | WO-2014/012962 A1 | 1/2014 |

OTHER PUBLICATIONS

Office Action in CN Application No. 201880040000.0 dated Jan. 12, 2022, 8 pages.
European Search Report in EP Application No. 21202259.4 dated Jan. 21, 2022, 4 pages.
Office Action in JP Application No. 2020-514326 dated Mar. 7, 2022, 6 pages.

* cited by examiner

GAS-LIQUID SEPARATOR FOR A CHROMATOGRAPHY SYSTEM

CROSS-REFERENCE TO RELATED APPLICATIONS

This application is a divisional of U.S. application Ser. No. 16/613,850 filed Nov. 15, 2019, which is the U.S. national stage of PCT/EP2018/062537 filed May 15, 2018, which claims the priority benefit of German Application No. 10 2017 110 601.4 filed May 16, 2017, German Application No. 10 2017 130 820.2 filed Dec. 20, 2017, and German Application No. 10 2017 125 816.7 filed Nov. 6, 2017, the respective disclosures of which are hereby incorporated by reference in their entirety for all purposes herein.

BACKGROUND OF THE INVENTION

Field of the Invention

The present invention relates to a gas-liquid separator for a chromatography system and to methods for the division of gas-liquid mixtures.

Related Technology

Many advantages can be achieved via Supercritical Fluid Chromatography (SFC), such that different substances can be divided, chemically analyzed, identified and quantified easily and reliably. When using carbon dioxide ($CO_2$) as a liquid in SFC applications, the extraction of the substances is generally performed above the critical temperature of 31° C. and above a critical pressure of 74 bar.

In order to keep $CO_2$ or a $CO_2$ mixture in a liquid state within a chromatography column, the entire chromatography system must be kept at a predetermined pressure level. To this end, a back-pressure regulator is typically provided downstream of the chromatography column and downstream of each detector in order to keep the pressure within the chromatography system at a specified level.

In practical applications, SFC technology has the disadvantage that the mobile phase of the chromatographically divided substances cannot simply be collected in open vessels. As soon as a mixture of liquid $CO_2$ and an additional solvent is exposed to atmospheric pressure, the $CO_2$ expands and forms an aerosol with the additional solvent. A loss-free collection of the solvent requires an adequate gas-liquid division of the aerosol. Gas-liquid mixtures can generally be divided into a gaseous and a liquid component using inertial separators operating according to the cyclone principle. There, an aerosol is introduced tangentially into a conical vessel. The aerosol spreads out along a circular path, such that its liquid particles drift radially outwards until they impinge the side wall of the vessel. Due to their reduced specific mass, gaseous components experience less inertia and can exit the conical vessel by means of a central immersion tube.

In an SFC, however, the composition of the aerosol can vary greatly, because a solvent gradient is often used to divide substances. The mixture of $CO_2$ and an additional solvent such as methanol can, for example, vary from 10% to 60% methanol fraction. As a result, the constitution of the aerosol and its volume stream may vary accordingly, resulting in suboptimal division rates of gaseous and liquid aerosol fractions in a cyclone separator.

Other gas-liquid division systems use, for example, impact separation, wherein the aerosol volume stream is directed to a baffle plate which may optionally be provided by a test tube. In general, impact separators and inertial separators require a comparatively large volume into which the aerosol can expand. Such comparatively large vessels are not optimal with regard to self-cleaning effects, since cross-contamination of aerosols and substances that are processed successively by such separators can occur. In particular, the differences in transit times of the substances must be very large in order to ensure sufficient division. In principle, the size and surface of the impact separator can be minimized when operating at elevated pressure levels.

For example, a test tube serving as a deflecting plate may be provided in a pressurized environment. The aerosol can then escape through a curved outlet and impinge the side wall of the test tube at a predetermined angle. With such an impact separator, it is indeed possible to collect smaller quantities of a substance with much less effort. However, impact separators operating at an elevated pressure level do not allow for large scale automated fractionation.

The operating costs and installation costs are therefore comparatively high, since only a limited number of test tubes can be automatically processed in the pressure region. In addition, the division speed is not as good as that of separators operating at atmospheric pressure.

SUMMARY

Considering the state of the art, it is therefore the object of the present invention to provide a gas-liquid separator for a chromatography system that solves the problems described above. The gas-liquid separator should in this case be as simple and inexpensive to manufacture as possible. Furthermore, the volume of the gas-liquid separator should be as small as possible in relation to the volume stream with which the chromatography system is operated.

It was a further object of the present invention to provide a gas-liquid separator which achieves excellent separation of the liquid from the mixture in the case of greatly differing and varying aerosol compositions. Furthermore, the gas-liquid separator should be easy to clean and low-maintenance.

In addition, it was therefore also an object of the present invention to provide a gas-liquid separator with a particularly high separation performance. In particular, the gas should be removed as completely as possible from the liquid. However, it is almost even more important that as small a proportion of the liquid as possible remains in the gas stream which is discharged from the gas-liquid separator in order to ensure the highest possible yield of the purified substances. This high separation performance should be achievable for as many differing gas-liquid mixtures as possible.

A further object constitutes the provision of a gas-liquid separator in which the substances introduced separately into the gas-liquid separator by the chromatography column are not tainted by contamination. For this purpose, the gas-liquid separator should be able to be rinsed with as low an aerosol volume as possible. Furthermore, there should be no encrustations or adhesions in the gas-liquid separator which could contaminate a subsequent fraction. In particular, the substances to be divided should be able to have the smallest possible difference in transit time without their separation in the gas-liquid separator being ruined. Furthermore, the gas-liquid separator should achieve the highest possible separation of the batches for a predetermined transit time difference.

A further object consists of providing a gas-liquid separator which allows for a simple conversion of a known HPLC system into an SFC system.

These as well as further objects which are not explicitly mentioned, but which can be easily deduced or derived from the contexts discussed in this introduction are solved by a gas-liquid separator for a chromatography system as disclosed and claimed herein.

Accordingly, the subject of the present invention is a gas-liquid separator for a chromatography system, comprising:
a) a separating region having an inlet nozzle, a baffle unit and a gas distribution unit;
b) a dividing region having a liquid outlet; and
c) a gas discharge region having a gas outlet;
which is characterized in that the separating region is connected to the dividing region by a separating opening and the distance of the inlet nozzle from the baffle unit is greater than the smallest longitudinal extension of the separating opening and the inlet nozzle is configured such that a gas-liquid stream directed through the inlet nozzle can act on the baffle unit.

In particular, the present invention has the effect of improving the separation performance of the gas-liquid separator, in particular achieving a very high separation of the liquid from the aerosol. Furthermore, contamination of the substances divided in the chromatography column and introduced into the gas-liquid separator can be reliably avoided. In particular in comparison with other gas-liquid separators, an improvement is achieved to the extent that a very high separation of the batches by the gas-liquid separator can be achieved with a predetermined difference in transit time. Furthermore, a very good division in the gas-liquid separator can be achieved with a relatively small difference in transit time of the substances to be divided.

Furthermore, the gas-liquid separator can be manufactured very inexpensively and simply. In addition, the gas-liquid separator is low-maintenance and easy to clean.

Furthermore, very good gas-liquid division can also be achieved with different gas-liquid compositions. In addition, a gas-liquid separator can also be used with very different volume streams of the aerosol without the separation of the aerosol being severely impaired.

Furthermore, an automated fractionation is possible, which can be scaled as required without large investments being necessary.

Furthermore, the gas-liquid separator can reduce the complexity and cost of the technical equipment required to set up the SFC analysis.

The present invention is based on the concept that an unexpected improvement in impact separation can be achieved by arranging and designing a separating opening. In particular, this can reduce the gas volume provided during impact separation, so that the total volume of the gas-liquid separator can be reduced. This can improve the separation performance described above.

The gas-liquid separator according to the invention comprises a separating region having an inlet nozzle, a baffle unit and a gas distribution unit.

Preferably, the separating region is configured in such a way that impact separation is achieved. Impact separation means that the liquid droplets in the aerosol are directed against a baffle unit, thus allowing the liquid droplets to form a liquid film. The aerosol can be directed in a direct jet from the inlet nozzle to a baffle unit. Furthermore, two or more baffle units may be provided in the separating region, by which a gas-liquid division of the aerosol takes place at least partially. Furthermore, the aerosol can be introduced into the separating region via two or more inlet nozzles, wherein a diversion of the respective aerosol streams can be achieved.

Any body against which the aerosol stream can be directed can serve as a baffle unit. For example, the aerosol stream can be directed towards an upper part of the separating region, for example towards an upper end of the separating region. A projection, such as a mandrel or the like, may be provided to which the aerosol stream is applied, such that the liquid droplets directed onto the baffle unit are not reflected or rebounded from the baffle unit, but instead form a film. Depending on the type of introduction of the aerosol stream or streams into the separating region described above, the baffle unit can occupy a more or less large area within the separating region. In the case of a very strong deflection by the introduction of two or more aerosol streams into the separating region, the entire inner surface of the separating region in the upper part of the same can be regarded as a baffle unit.

The present gas-liquid separator uses gravity during operation, which causes a division of gas and liquid. Accordingly, the term above refers to the orientation of the gas-liquid separator during operation so that a gas can flow upwards, while below is the opposite direction in which a liquid exits the gas-liquid separator.

In a preferred configuration, it may be provided that the baffle unit is substantially flat and may be regarded as a baffle plate, said baffle plate preferably forming a wall of the separating region and constituting a side wall of the gas distribution unit. The term "substantially flat" means that the baffle unit or the baffle plate is not bent but may have a surface structure. In a specific configuration, the impact plate is preferably configured without a surface structure, so that this surface is smooth.

In a preferred embodiment, the baffle unit preferably comprises a surface structure, whether said embodiment is preferred over one having a smooth surface. In this case, the surface structure preferably has elevations and depressions, the elevations with respect to the depressions preferably having a height in the range from 0.2 to 10 mm, particularly preferably in the range from 0.8 to 8 mm and especially preferably in the range from 1.5 to 5 mm.

It may further be provided that the ratio of the height of the elevations (in relation to the depressions) to the volume of the gas-liquid separator is preferably in the range from 0.01 to 10 mm/ml, particularly preferably in the range from 0.03 to 5 mm/ml.

In a further configuration, the surface structure of the baffle unit has grooves, wherein the elevations and depressions of the grooves are preferably aligned in the direction that is formed by the inlet nozzle and the separating opening or are preferably aligned parallel to this direction.

The volume of the gas-liquid separator can be kept particularly small by a structured surface of the baffle unit, which is preferably formed as a grooved structure, and thus the separation performance can be improved. In this case, the substances to be divided may have a relatively small difference in transit time without their division in the gas-liquid separator being ruined. Furthermore, the separation level of the liquid from the aerosol can be improved in relation to the volume of the gas-liquid separator.

In a further preferred configuration, it may be provided that the baffle unit has a curvature or bend, wherein the radius of curvature is preferably small. In this case, the baffle unit is preferably formed as part of an upper end or as part of a gas acceleration unit, as described in more detail later.

In a further development of the present invention, the baffle unit preferably has a surface region with a surface energy of at least 10 mN/m, particularly preferably of at least 15 mN/m and especially preferably of at least 20 mN/m. Preferably, it may be provided that the baffle unit preferably has a surface region with a surface energy in the range from 15 to 120 mN/m, particularly preferably in the range from 20 to 80 mN/m and especially preferably in the range from 22 to 60 mN/m, wherein preferably at least 80%, particularly preferably at least 90%, of the surface of the baffle unit has a surface energy in the range from 20 to 80 mN/m, especially preferably in the range from 22 to 60 mN/m. This surface energy can be achieved by selecting the appropriate material from which the baffle unit is made.

Furthermore, the baffle unit may have a surface region with a coating in order to adjust the above-mentioned surface energy, wherein preferably at least 80%, particularly preferably at least 90%, of the surface of the baffle unit has a coating.

The surface energy is determined by the method of Ownes-Wendt-Rabel & Kaelble. For this purpose, measurement series are carried out with the Busscher standard series in which water [SFT 72.1 mN/m], formamide [SFT 56.9 mN/m], diiodomethane [SFT 50.0 mN/m] and alpha-bromonaphthalene [SFT 44.4 mN/m] are used as test liquids. The measurement is carried out at 20° C. The surface energy can be determined with a contact angle measuring system G40 of the company Krüss, Hamburg, wherein the implementation is described in the user manual of the contact angle measuring system G40, 1993. With regard to the calculation methods, reference is to be made to A. W. Neumann, Über die Messmethodik zur Bestimmung grenzflächenenergetischer Größen, Part I, Zeitschrift für Phys. Chem., vol. 41, pp. 339-352 (1964), and A. W. Neumann, Über die Messmethodik zur Bestimmung grenzflächenenergetischer Größen, Part II, Zeitschrift für Phys. Chem., vol. 43, pp. 71-83 (1964).

In a preferred embodiment, it can be provided that the gas stream be directed to a second baffle unit after colliding with the baffle unit. Surprisingly, the separation performance, in particular the division of the liquid from the aerosol, can be improved through this configuration. Preferably, the aerosol can first be directed to a first baffle unit, which is formed, for example, by a wall of the separating region. Subsequently, the gas stream can be directed to a second baffle unit, which is preferably provided in the upper region of the separating region, particularly preferably in the upper end of the separating region.

It may also be further provided that two baffle units are provided in the separating region, wherein the first baffle unit is arranged below the second baffle unit. The aerosol stream is first directed to the first baffle unit, which is located below the second baffle unit, and then on the second baffle unit.

In addition to a baffle unit, an inlet nozzle is provided in the separating region of the gas-liquid separator of the present invention. The aerosol is directed through the inlet nozzle into the gas-liquid separator, in particular into the separating region of the gas-liquid separator.

In this case, the inlet nozzle is configured in such a way that a gas-liquid stream directed through the inlet nozzle can act on the baffle unit, as has already been demonstrated with regard to the baffle unit.

The shape and type of the inlet nozzle are uncritical, such that it can be chosen by the specialist according to his abilities. For example, the inlet nozzle can be configured so that the aerosol is directed to the baffle unit as a very narrow jet. Furthermore, the inlet nozzle can also be constructed in such a way that a conical mist is directed to the baffle unit.

In this case, the nozzle can end with the wall of the separating region or protrude into the separating region via a projection. The embodiment with a projection is advantageous if the baffle unit is provided in the upper end of the separating region.

The inlet nozzle is particularly preferably configured in the form of a simple bore or a simple opening. In a further development, it may be provided that the inlet nozzle provided in the separating region has an entry surface which is substantially circular.

It may further be provided that the inlet nozzle provided in the separating region has an entry surface in the range from $0.05$ $mm^2$ to $20$ $mm^2$, preferably in the range from $0.5$ $mm^2$ to $15$ $mm^2$, particularly preferably in the range from $0.5$ $mm^2$ to $10$ $mm^2$ and especially preferably in the range from $0.8$ $mm^2$ to $5$ $mm^2$. In a further embodiment, it may be provided that the inlet nozzle provided in the separating region has an entry surface in the range from $2$ $mm^2$ to $40$ $mm^2$, preferably in the range from $4$ $mm^2$ to $20$ $mm^2$ and especially preferably in the range from $5$ $mm^2$ to $15$ $mm^2$. This value refers to the size of a single inlet nozzle if multiple inlet nozzles are used.

If the inlet nozzle is formed as a bore, this bore preferably has a diameter in the range from 0.3 mm to 5 mm, preferably 0.5 mm to 4 mm, particularly preferably 0.8 mm to 3 mm, particularly preferably 1 mm to 2 mm and/or especially preferably 2 to 3 mm. This value refers to the size of a single inlet nozzle if multiple inlet nozzles are used.

It may further be provided that the ratio of the entry surface of the inlet nozzle provided in the separating region to the volume of the gas-liquid separator is in the range from $0.01$ $mm^2/ml$ to $1$ $mm^2/ml$, preferably in the range from $0.04$ $mm^2/ml$ to $0.4$ $mm^2/ml$, particularly preferably in the range from $0.08$ $mm^2/ml$ to $0.25$ $mm^2/ml$ and especially preferably in the range from $0.08$ $mm^2/ml$ to $0.17$ $mm^2/ml$. This value refers to the sum of the surfaces of all inlet nozzles used, if multiple inlet nozzles are used.

It may further be provided that the ratio of the entry surface of the inlet nozzle provided in the separating region to the volume of the separating region is in the range from $1:3$ $mm^2/ml$ to $1:50$ $mm^2/ml$, preferably in the range from $1:5$ $mm^2/ml$ to $1:20$ $mm^2/ml$ and especially preferably in the range from $1:7$ $mm^2/ml$ to $1:15$ $mm^2/ml$. In a further configuration it may be provided that the ratio of the entry surface of the inlet nozzle provided in the separating region to the volume of the separating region is in the range from $4:1$ $mm^2/ml$ to $1:50$ $mm^2/ml$, preferably in the range from $1:1$ $mm^2/ml$ to $1:20$ $mm^2/ml$ and especially preferably in the range from $2:3$ $mm^2/ml$ to $1:5$ $mm^2/ml$. This value refers to the sum of the surfaces of all inlet nozzles used, if multiple inlet nozzles are used.

One or more inlet nozzles may be provided in the separating region. In the event that multiple inlet nozzles are provided, these are preferably aligned parallel to each other. The gas-aerosol mixture is preferably directed into the separating region via exactly one inlet nozzle, preferably to the baffle unit located in the separating region.

In a further preferred embodiment, the separating region comprises two or more inlet nozzles, wherein these inlet nozzles are preferably arranged such that the stream of the gas-aerosol mixture is directed against different parts of a baffle unit or against different baffle units. Preferably, the two or more inlet nozzles are configured in such a way that the gas-liquid streams passing through two or more inlet nozzles are directed towards each other so that, without the baffle unit, they would meet at least partially. Accordingly, the baffle unit or the baffle units in this preferred embodiment with two or more inlet nozzles is or are preferably located between the two or more inlet nozzles.

In further preferred embodiment, the separating region comprises two or more inlet nozzles, wherein said inlet nozzles are preferably arranged so as to reduce the stream velocity of the gas-aerosol mixture in the upper region of the separating region. Accordingly, it may be preferably provided that the gas-liquid streams passing through two or more inlet nozzles are directed towards each other. In this preferred embodiment, parts of the side walls of the separating region, for example, form the respective baffle units. Surprisingly, the separation performance, in particular the division of the liquid from the aerosol, can be improved through this configuration. In this case, the two or more inlet nozzles can be arranged in such a way that a maximum attenuation of the respective gas streams is achieved. It can be further provided that the two or more inlet nozzles are directed towards each other, but the respective gas-liquid streams are slightly offset from each other, so that the respective gas streams are attenuated, but this attenuation of the respective gas streams is not the maximum. The attenuation of the respective gas streams is measured according to the original velocity vector of the respective gas stream, which comprises the original direction of the gas stream.

It may be further provided that the inlet nozzle is configured such that a gas-liquid stream directed through the inlet can act on the baffle unit and the angle at which a gas-liquid stream directed through the inlet nozzle can act on the baffle unit is preferably in the range from 50 to 130°, particularly preferably in the range from 70 to 110°. This angle can be determined in particular by the direction of the inlet nozzle, with which the inlet nozzle is directed towards the baffle unit. These specifications refer to the angle at which the main jet of the aerosol is directed to the baffle unit. The shape of the aerosol jet is insignificant in itself, as far as impact separation can be achieved. The liquid droplets of the aerosol should flow together through the impact on the baffle unit and preferably form a film. Therefore, the inlet nozzle should be selected such that the liquid droplets of the aerosol do not become too small.

In a preferred embodiment, two baffle units are provided in the separating region, wherein the inlet nozzle first directs the gas stream to the first baffle unit, as already explained above. Any known device can be used to transfer the gas stream to the second baffle unit. For example, a deflection at the first baffle unit can be achieved by an appropriate angle and/or shape of the first baffle unit. In a preferred configuration it can be provided that a diverting unit is provided to direct the aerosol stream to the second baffle unit. The diverting unit preferably has at least three boundary surfaces so that the gas stream is directed from the inlet of the inlet nozzle via an outlet opening to the second baffle unit. Accordingly, the diverting unit is preferably a recess, the bottom of which may be U or V-shaped and has two opposite side surfaces and an end surface preferably serving as the first baffle unit, so that a space is defined between the inlet of the inlet nozzle and the first baffle unit. Preferably, the inlet nozzle directs the aerosol or gas stream parallel to the bottom of the recess, so that it hits the front surface, which is configured as the first baffle unit. The aerosol stream is then directed through the outlet opening of the recess or the diverting unit to the second baffle unit. In a preferred configuration, the gas stream is directed upwards during diversion, preferably at an angle which is preferably in the range 50 to 130°, particularly preferably in the range 70 to 110°, relative to the direction of the aerosol stream directed from the inlet nozzle to the first baffle unit. Through this embodiment, the stream velocity of the aerosol stream is preferably slowed down, wherein the gas stream reflected by the first baffle unit, preferably the end surface of the diverting unit, preferably the recess, is first directed against the aerosol stream which is introduced from the inlet nozzle into the diverting unit, preferably the recess.

It may further be provided that the discharge opening of the diverting unit or the recess preferably provided in the separating region has an outlet surface in the range from 0.1 $mm^2$ to 60 $mm^2$, preferably in the range from 1.5 $mm^2$ to 40 $mm^2$ and especially preferably in the range from 3 $mm^2$ to 20 $mm^2$.

Preferably, it can be provided that the outlet surface of the outlet opening of the diverting unit or the recess is at least as large as the entry surface of the inlet nozzle. Preferably, the area ratio of the discharge opening of the diverting unit or the recess preferably provided in the separating region to the entry surface of the inlet nozzle provided in the separating region is in the range from 20:1 to 1:1, preferably in the range from 15:1 to 3:2 and especially preferably in the range from 5:1 to 2:1.

It may further be provided that the diverting unit or recess preferably provided in the separating region has a width in the range from 0.3 mm to 8 mm, preferably 0.8 mm to 5 mm and particularly preferably 1.5 mm to 4 mm. The width of the diverting unit or recess indicates the maximum distance between at least two opposite side surfaces.

It may further be provided that the diverting unit or recess preferably provided in the separating region has a length in the range from 1 mm to 60 mm, preferably 5 mm to 40 mm and particularly preferably 10 mm to 30 mm. The length of the diverting unit or recess indicates the distance between the surface configured as the baffle unit and the inlet nozzle.

In addition, it may be provided that the diverting unit or recess preferably provided in the separating region has a height in the range of 0.5 mm to 40 mm, preferably 1.5 mm to 30 mm and particularly preferably 5 mm to 20 mm. The height of the diverting unit or recess indicates the distance between the bottom and the discharge opening of the diverting unit or recess.

The gas-liquid separator has a separating opening which is arranged between the separating region and the dividing region so that there is a gas-liquid-open connection between these regions. Through the separating opening, inertial separation is preferably caused. This means that the liquid running downwards at the baffle unit and/or the gas distribution unit in the form of a liquid film is separated from the gas by inertia. In this case, the gas preferably accelerates the liquid, so that the liquid is transferred to the dividing region at a higher speed than without this gas acceleration. In this case, the liquid film preferably remains on a wall of the separating region, which is preferably configured as part of the baffle unit and/or the gas distribution unit, in the form of a film and passes directly into the dividing region without the liquid film leaving the wall that passes into the dividing region. In contrast to the liquid phase, the gas phase does not adhere to a wall, but is able to escape upwards and pass into the gas discharge region. In contrast, the liquid is discharged into the dividing region and removed from the gas-liquid separator by the liquid outlet provided in the dividing region.

The shape of the separating opening is not critical as far as the previously described function of the opening can be fulfilled. Preferably, however, it may be provided that the separating opening has an exit surface which is gap-shaped or has multiple parallel openings which may be, for example, U-shaped, V-shaped or circular.

According to the invention, the distance of the inlet nozzle from the baffle unit is greater than the smallest longitudinal extension of the separating opening. The distance between the inlet nozzle and the baffle unit is determined by the path of the aerosol from leaving the inlet nozzle until it hits the baffle unit. The smallest longitudinal extension of the separating opening refers to the width or length of the separating opening, wherein the extension of the plane to the edge of the separating opening refers to the plane between the separating region and the dividing region, which leads to a minimum surface of the separating opening. In this plane, in which the separating opening is located, the length of the longest extension of the separating opening is determined so that the shortest length of the separating opening perpendicular to the longest extension of the separating opening can then be measured. This smallest longitudinal extension can also be considered to be the width of the separating opening.

If the separating opening is gap-shaped, it preferably has a gap width in the range from 0.1 mm to 1.5 mm, particularly preferably 0.3 mm to 1.0 mm and especially preferably 0.4 mm to 0.7 mm (smallest longitudinal extension). In the case of a circular or elliptical separating opening, the length of the gap is determined by the circumference, wherein these values can preferably lie in the range from 5 mm to 120 mm, particularly preferably in the range from 10 mm to 60 mm.

If the separating opening is gap-shaped, it preferably has, in a further embodiment, a gap width in the range from 0.1 mm to 3.0 mm, particularly preferably 0.3 mm to 2.0 mm and especially preferably 0.4 mm to 1.5 mm (smallest longitudinal extension). In the case of a circular or elliptical separating opening, the length of the gap is determined by the circumference, wherein, in a further embodiment, these values can preferably lie in the range from 5 mm to 150 mm, particularly preferably in the range from 10 mm to 80 mm.

In the case of a non-circular or non-elliptical separating opening having a gap shape which is preferably characterized by two ends, its length is preferably in the range from 3 to 80 mm, more preferably in the range from 5 to 50 mm, particularly preferably in the range from 15 to 30 mm.

If the separating opening is formed by multiple parallel openings, which may be, for example, U-shaped, V-shaped or circular, the dimensions given above shall apply accordingly, the openings preferably having a width in the range 0.1 mm to 1.5 mm, particularly preferably 0.3 mm to 1.0 mm and especially preferably 0.4 mm to 0.7 mm (smallest longitudinal extension). In a further embodiment, the openings can preferably have a width in the range from 0.1 mm to 3.0 mm, particularly preferably 0.3 mm to 2.0 mm and especially preferably 0.4 mm to 1.5 mm (smallest longitudinal extension).

The gap width is measured perpendicular to the length or circumference of the gap and is the smaller longitudinal extension of the gap opening which can be considered to be the transition plane from the separating region to the dividing region. This transition plane has the smallest two-dimensional extension in the area of transition from the separating region to the dividing region.

Preferably, the separating opening has an outlet surface in the range from 10 to 120 $mm^2$, particularly preferably in the range from 15 to 60 $mm^2$ and especially preferably in the range from 15 to 40 $mm^2$. In a further embodiment, the separating opening can have an outlet surface in the range from 10 to 180 $mm^2$, particularly preferably in the range from 15 to 120 $mm^2$ and especially preferably in the range from 30 to 100 $mm^2$. It may further be provided that the ratio of the outlet surface of the separating opening to the volume of the gas-liquid separator is in the range from 0.05 $mm^2$/ml to 2 $mm^2$/ml, particularly preferably in the range from 0.1 $mm^2$/ml to 1 $mm^2$/ml and especially preferably in the range from 0.3 $mm^2$/ml to 0.8 $mm^2$/ml. In a further embodiment, it may be provided that the ratio of the outlet surface of the separating opening to the volume of the gas-liquid separator is in the range from 0.05 $mm^2$/ml to 6 $mm^2$/ml, particularly preferably in the range from 0.3 $mm^2$/ml to 3 $mm^2$/ml and especially preferably in the range from 0.5 $mm^2$/ml to 2.0 $mm^2$/ml.

The spatial form of the separating region is not critical and can be adapted to the needs in question. In this case, it is essential that a gas distribution unit is formed in the separating region. The gas distribution unit causes a change in the stream velocity of a gas, so that the gas velocity in the region of the inlet nozzle is lower than in the region of the separating opening. Since the volume stream can be regarded as constant with the same aerosol composition, this means that the aerosol is first directed into a relatively large space, which is then narrowed so that the stream velocity increases.

Accordingly, the cross-sectional surface of the separating region can be circular, wherein, for example, the inlet nozzle narrows it towards the separating opening, preferably in a wedge-shaped manner.

In a preferred embodiment, the separating region does not have a circular cross-sectional surface in the region of the inlet nozzle, wherein the separating region preferably comprises at least three side walls which, together with an upper end, define a space which is connected to the dividing region by the separating opening. This configuration, in which the separating region does not comprise a circular cross-sectional surface, but instead a cross-sectional surface with corners, in particular a triangular, square, pentagonal or hexagonal cross-sectional surface, particularly preferably a rectangular one, is easier to produce with the required precision, wherein the volume of the gas-liquid separator can be better adapted to the requirements. In particular, gas-liquid separators suitable for particularly small volume streams can also be provided. In contrast to gas-liquid separators with a circular cross-sectional surface, gas-liquid separators with a non-circular cross-sectional surface, preferably a cross-sectional area with corners, can have exactly one inlet nozzle without regions of insufficient wetting with a gas-liquid mixture occurring.

Preferably, it may be provided that the gas distribution unit has at least two substantially flat side walls which may be regarded as gas distribution plates, wherein these gas distribution plates preferably form walls of the separating region. These two substantially flat side walls can converge so that a wedge shape is formed.

It may further be provided that the gas distribution unit has at least two side walls, wherein at least one of the side walls is bent so as to provide a concave shape such that the two side walls can converge, wherein the distance between the side walls is greater in the upper region of the separating region determined by the proximity of the inlet nozzle than in the lower region of the separating region determined given by the proximity of the separating opening, wherein the decrease in the distance from the upper region to the lower region decreases.

Preferably, it can be provided that the gas distribution unit has a gas acceleration unit which, together with at least one side wall, preferably at least two side walls, causes a change in the stream velocity of a gas.

In a further configuration, it may be provided that the cross-sectional surface of the gas distribution unit decreases from the inlet nozzle in the direction of the separating opening at least in regions, preferably in the region facing the separating opening, so that the planes which are perpendicular to the stream direction of the gas-liquid mixture become smaller, wherein this decrease is preferably continuous, so that preferably at least two of the side walls of the gas distribution unit form a wedge shape in longitudinal section.

In a further configuration, it may be provided that the separating region comprises an upper end, said upper end comprising a curvature or an angle, wherein the highest point of the curvature or the angle is preferably arranged centrally and thereby located on a line with the inlet nozzle which is imagined to be parallel to the gas stream direction or the stream direction of the liquid, thus parallel to the direction of gas inlet liquid outlet opening, wherein the upper end preferably merges into two side walls, so that the transition between the side walls and the upper end is curved.

In a preferred embodiment, two baffle units are provided in the separating region, wherein the inlet nozzle first directs the gas stream to the first baffle unit, as already explained above. In a preferred embodiment, it can be provided that the second baffle unit is provided in the region of the upper end. Accordingly, the aerosol is preferably directed through a diverting unit from the first baffle unit to the second baffle unit arranged in the upper end.

In a further development of the present invention, it may be provided that the separating region comprises at least four side walls which, together with an upper end, define a space which forms the gas distribution unit, wherein one of the side walls is formed as a baffle unit, wherein this space is connected to the dividing region by the separating opening. In this embodiment, in which the separating region comprises at least four side walls which, together with an upper end, define a space, it may preferably be provided that the distance between two opposite side walls is greater than half the distance of the inlet nozzle from the baffle unit. Preferably, in this embodiment, in which the separating region comprises at least four side walls which, together with an upper end, define a space, the ratio of the distance between two opposite side walls to the distance of the inlet nozzle from the baffle unit can be provided in the range from 0.8 to 8, particularly preferably in the range from 0.9 to 6, especially preferably in the range from 1.0 to 4 and particularly preferably in the range from 1.2 to 2. These values refer in particular to two opposite side walls which have the largest distance.

In a further development of the present invention, it may be provided that the separating region comprises at least two, preferably at least three, side walls which, together with an upper end and a gas acceleration unit, define a space which forms the gas distribution unit, wherein one of the side walls, the gas acceleration unit or the upper end is formed as a baffle unit, wherein this space is connected to the dividing region by the separating opening. In this embodiment, in which the separating region comprises at least two side walls and a gas acceleration unit which, together with an upper end, define a space, it may preferably be provided that the distance between two opposite side walls is greater than half the distance of the inlet nozzle from the baffle unit. Preferably, in this embodiment, the separating region can be provided with at least two side walls and a gas acceleration unit, which together with an upper end define a space, in which the ratio of the distance between two opposite side walls to the distance of the inlet nozzle from the baffle unit is in the range from 0.8 to 8, particularly preferably in the range from 0.9 to 6, especially preferably in the range from 1.0 to 4 and particularly preferably in the range from 1.2 to 2. These values refer in particular to two opposite side walls which have the largest distance.

It may further be provided that the inlet nozzle is provided in the upper region of the separating region, particularly preferably in the upper third of the separating region, this direction resulting from the arrangement of the inlet and the liquid outlet, so that the inlet nozzle is arranged above the liquid outlet.

In addition to the separating region described above, a gas-liquid separator according to the invention has a dividing region. In the dividing region, as already indicated, the phases are divided, wherein the dividing region has a liquid outlet through which the liquid phase is removable from the gas-liquid separator. The gas phase is directed into the gas discharge region. Accordingly, the dividing region is connected to the gas discharge region via an opening and is in fluid contact with it.

Preferably, it may be provided that the dividing region having a liquid outlet comprises a bottom which preferably comprises a curvature, an arc, an angle or another shape leading to a taper, wherein the liquid outlet is provided in the region of the deepest point of the bottom.

It may further be provided that the liquid outlet is provided in the lower region of the dividing region, particularly preferably in the lower third of the dividing region, this direction resulting from the arrangement of the inlet nozzle and the liquid outlet, so that the inlet nozzle is arranged above the liquid outlet.

In a further embodiment, it may be provided that the inner surface of the dividing region has a surface region with a surface energy in the range from 15 to 120 mN/m, particularly preferably in the range from 20 to 80 mN/m and especially preferably in the range from 22 to 60 mN/m, wherein preferably at least 80%, particularly preferably at least 90%, of the surface of the dividing region has a surface energy in the range from 20 to 80 mN/m, particularly preferably in the range from 22 to 60 mN/m. Preferably, the difference between the surface energy of the inner surface of the dividing region and the surface energy of the inner surface of the separating region can be at least 10 mN/m, preferably at least 30 mN/m, wherein these values refer to the respective maximum or minimum, so that the difference is maximum.

It may further be provided that the separating region has a cross-sectional surface in the region of the inlet nozzle which is at least 80%, preferably at least 90%, of the maximum cross-sectional area of the dividing region, the cross-sectional surfaces being related to the planes which are perpendicular to the baffle unit and perpendicular to the direction of main impact of the gas-liquid mixture opening, The gas discharge region serves to discharge the gas phase from the gas-liquid separator so that it comprises a gas outlet.

Preferably, the gas discharge region is configured in such a way that the gas velocity at the gas outlet is maximum, preferably the gas velocity in the gas stream direction seen from the dividing region towards the gas outlet increases. This can create a suction effect which leads to safe and low-maintenance operation of the gas-liquid separator. Furthermore, the volume of the gas-liquid separator can be reduced without its performance decreasing in other properties, e.g. division properties.

In reversal of the separating region, the space from the dividing region to the gas outlet therefore decreases. Preferably, the cross-sectional surface tapers from the direction of the dividing region to the gas outlet.

In a further development of the gas-liquid separator, it may be provided that the gas discharge region is configured such that the surface of imaginary planes which are perpendicular to the direction of the dividing region to the gas outlet decreases starting from the dividing region towards the gas outlet, wherein this decrease is preferably continuous, wherein preferably the gas distribution unit forms a side wall of the gas discharge region and in longitudinal section this side of the gas distribution unit forms a wedge shape with a further side wall of the gas discharge region.

It may further be provided that the gas outlet is provided in the upper region of the gas discharge region, particularly preferably in the upper third of the gas discharge region, this direction resulting from the arrangement of the inlet nozzle and the liquid outlet, so that the inlet nozzle is arranged above the liquid outlet.

Furthermore, it may be provided that the inner surface of the gas discharge region has a surface region with a surface energy in the range from 10 to 40 mN/m, wherein preferably at least 80%, particularly preferably at least 90%, of the surface of the gas discharge region has a surface energy in the range from 10 to 30 mN/m.

In addition, it may be provided that the separating region is arranged above the dividing region and the gas discharge region is arranged above the dividing region, this direction resulting from the arrangement of the inlet nozzle and the liquid outlet, so that the inlet nozzle is arranged above the liquid outlet.

It may further be provided that the separating region is arranged above the dividing region and the gas discharge region is arranged above the dividing region, this direction resulting from the arrangement of the inlet nozzle and the liquid outlet so that the inlet nozzle is arranged above the liquid outlet.

Furthermore, it may be provided that the volume ratio of separating region to dividing region is preferably in the range from 4:1 to 1:10, more preferably in the range from 2:1 to 1:6 and especially preferably in the range from 1:1 to 1:3.

It may further be provided that the volume ratio of separating region to dividing region is preferably in the range from 6:1 to 1:6, more preferably in the range from 4:1 to 1:4 and especially preferably in the range from 2:1 to 1:2.

In a further embodiment, it may be provided that the volume ratio of the separating region to the gas discharge region is preferably in the range from 10:1 to 1:10, more preferably in the range from 5:1 to 1:5 and especially preferably in the range from 2:1 to 1:2.

It may further be provided that the volume ratio of dividing region to gas discharge region is preferably in the range from 10:1 to 1:4, more preferably in the range from 6:1 to 1:2 and especially preferably in the range from 3:1 to 1:3.

It may further be provided that the height of the separating region is preferably in the range from 1 cm to 100 cm, particularly preferably in the range from 5 cm to 20 cm.

It may further be provided that the width of the separating region is preferably in the range from 0.5 cm to 20 cm, particularly preferably in the range from 1.5 cm to 10 cm.

In addition, it may be provided that the depth of the separating region preferably in the range of 0.5 cm to 20 cm, particularly preferably in the range of 1.5 cm to 10 cm.

It may further be provided that the distance between the inlet nozzle and the baffle unit is in the range from 3 mm to 60 mm, particularly preferably in the range from 6 mm to 40 mm and especially preferably in the range from 10 mm to 25 mm.

It may further be provided that the height of the dividing region is preferably in the range from 0.5 cm to 20 cm, particularly preferably in the range from 2 cm to 5 cm.

It may further be provided that the width of the dividing region is preferably in the range from 0.5 cm to 20 cm, particularly preferably in the range from 1.5 cm to 10 cm.

In addition, it may be provided that the depth of the dividing region is preferably in the range from 0.5 cm to 20 cm, particularly preferably in the range from 1.5 cm to 10 cm.

It may further be provided that the height of the gas discharge region is preferably in the range from 0.5 cm to 20 cm, particularly preferably in the range from 2 cm to 5 cm.

Furthermore, it may be provided that the width of the gas discharge region is preferably in the range from 0.5 cm to 20 cm, particularly preferably in the range from 1.5 cm to 10 cm.

In addition, it may be provided that the depth of the gas discharge region is preferably in the range from 0.5 cm to 20 cm, particularly preferably in the range from 1.5 cm to 10 cm.

It may further be provided that the ratio of the height of the separating region to the height of the dividing region is preferably in the range from 1:2 to 10:1, particularly preferably in the range from 1:1 to 7:1 and especially preferably in the range from 3:1 to 6:1.

It may further be provided that the ratio of the height of the dividing region to the height of the gas discharge region is in the range 2:1 to 1:10, particularly preferably in the range 1:1 to 1:7 and especially preferably in the range 1:3 to 1:6.

Preferably, the gas-liquid separator in the separating region has a stream direction of the gas which is substantially parallel to the stream direction of the liquid. In this region, the gas-liquid mixture is led downwards by the gas pressure. In the dividing region, the stream direction of the gas is diverted so that it deviates from the stream direction of the liquid. The liquid flows substantially downwards, while the gas flows upwards in the dividing region and in the gas discharge region.

According to the above and following elaborations, the stream direction of the gas and the liquid is not parallel in the entire separating region, but instead in particular in the lower region of the separating region, preferably in the lower third of the separating region, wherein this direction results from the arrangement of the inlet and the liquid outlet, so that the inlet nozzle is arranged above the liquid outlet.

In a further preferred embodiment, it may be provided that the gas-liquid separator is set up in such a way that the stream velocity of the gas after the separating opening, in particular in the dividing region, is reduced by special measures. For this purpose, installations may be provided in the dividing region, e.g. diverting plates or diverting grids, which prevent a strong gas stream onto the liquid present in the dividing region.

Preferably the separating opening can be configured in such a way that the stream velocity of the gas is reduced. It may further be provided that the separating opening has two, three, four or more partial separating openings, the arrangement of which allows the stream velocity of the gas to be reduced. In particular, there may be two, three, four or more partial separating openings arranged so as to reduce the stream velocity of the gas. The stream velocity of the gas in the horizontal direction is preferably reduced by at least 5%, particularly preferably by at least 15% and especially preferably by at least 30%, wherein these figures are related to the original value of the stream velocity. The values can, for example, be determined by corresponding stream tests, wherein these are also available through simulation calculations. These values are preferably obtained by measuring the reduction in the amount of liquid carried by the gas.

Preferably, the partial separating openings are arranged substantially symmetrically so that the gas streams are attenuated in the horizontal direction. In the case of 2, 4, 6 or more partial openings, these are arranged opposite each other accordingly, or in the case of 3, 5 partial openings in the form of a triangle or pentagon, so that the gases flowing through the separating openings flow against each other in the horizontal direction and thus reduce the stream velocity of the gas.

In this case, the partial separating openings are preferably arranged symmetrically, with the axis of symmetry or the symmetry plane running parallel to the direction of stream of the gas or liquid in the separating region. Depending on the number of partial separating openings, there is a point or a mirror symmetry. The term "substantially symmetrically" means that an effective attenuation of the stream velocity of the gas is achieved in the dividing region. Preferably, this symmetry is defined by the geometry of the partial separating openings and/or the geometry of the gas distribution unit. Preferably, the ratio of the areas of the partial separating openings is in the range of 2:1 to 1:2, particularly preferably 1.5:1 to 1:1.5, especially preferably 1.2:1 to 1:1.2 with two partial separating openings. In the case of three or more partial separating openings, the values shall apply accordingly to the different pairs of partial separating openings so that the ratio of the area of the largest partial separating opening to the area of the smallest partial separating opening is preferably not more than 2:1, more preferably not more than 1.5:1 and especially preferably 1.2:1.

The gas-liquid separator can have one, two or more separating regions with one inlet nozzle, one baffle unit and one gas distribution unit each. In a preferred configuration, it may be provided that the gas-liquid separator comprises exactly one inlet nozzle having a baffle unit and the gas distribution unit is separated into two, three or more regions each comprising a (partial) separating opening. In a further configuration, it may be provided that the gas-liquid separator comprises a plurality of separate separating regions, each having exactly one inlet nozzle having a baffle unit, wherein the separating openings of the different (partial) separating regions are connected to exactly one dividing region. In yet another preferred configuration, the gas-liquid separator may be provided to comprise two or more inlet nozzles having a baffle unit configured such that the gas-liquid streams passing through two or more inlet nozzles are directed towards each other as previously described, and the gas distribution unit is separated into two, three or more regions each comprising a (partial) separating opening. In this way, the gas streams that pass through the various (partial) separating openings are directed into the same dividing region and the stream velocities of the gases reduce each other.

Preferably, the gas-liquid separator is configured in such a way that the stream velocity of the gas in the dividing region is reduced as much as possible in order to prevent the liquid present in the lower region of the dividing region from being carried along or absorbed. In a preferred embodiment in which two, three, four or more partial separating openings are present, these are preferably configured symmetrically. In the case of a preferred embodiment with two separating openings, these are therefore preferably of substantially the same size and opposite each other, so that the gas stream is minimized. Substantially preferably means that the ratio of the gas stream rate is preferably in the range from 2:1 to 1:2, particularly in the range from 1.5:1 to 1:1.5, in particular preferably in the range from 1.2:1 to 1:1.2. In the case of three or more partial separating openings, the values shall apply accordingly to the different pairs of partial separating openings so that the ratio of the gas stream rate of the largest partial separating opening to the gas stream rate of the smallest partial separating opening is preferably at most 2:1, more preferably at most 1.5:1 and especially preferably 1.2:1.

In particular, the gas stream rate can be calculated from the outlet surface of the respective partial separating opening, considering the geometry of the gas distribution unit. The gas stream rate of the separating opening can be determined by the stream rate at which chromatography is performed, wherein the outlet region of the separating opening is to be considered.

In the case of a configuration with two or more partial separating openings which are to be considered together as one separating opening, the sizes given above and below apply accordingly, e.g. indications regarding surfaces, lengths, widths, etc., wherein the term "separating opening" refers to the entirety of the partial separating openings.

A particularly preferred embodiment has exactly one or two separating region(s) having an inlet nozzle, a baffle unit and a gas distribution unit, wherein exactly two (partial) separating openings are provided. This configuration can be manufactured in a particularly simple manner by machining, preferably milling, a block of material that is preferably made of plastic. Preferably, a side wall is formed by a cover plate, which is connected to the milled material block by pressure created by, for example, screwing. The gas-liquid separator can be reliably cleaned by simply removing the screws and the cover plate.

In a preferred embodiment, a diverting unit, preferably a recess, is provided in the separating region, wherein the inlet nozzle first directs the gas stream to the first baffle unit, wherein in this embodiment the stream velocity of the gas in the dividing region is preferably additionally reduced as much as possible in order to prevent entrainment or absorption of the liquid present in the lower region of the dividing region, as has already been stated above. In a particularly preferred embodiment, it may be provided that the second baffle unit is located in the region of the upper end, so that the diverting unit directs the gas stream to a region in the upper end. The second baffle unit, which is configured as an internal curvature, is particularly preferable. In this case, the shape of the inner curvature is not critical.

In this particularly preferred embodiment, in which the second baffle unit is configured as an internal curvature, it may be provided that the separating region comprises an upper end, this upper end comprising more than one curvature or angle, so that a lower point is provided between two higher points in the upper region, wherein the lower point of the curvature or the angle is preferably arranged centrally and thereby located on a line with the inlet nozzle which can be imagined parallel to the gas stream direction or the stream direction of the liquid, i.e. from top to bottom, wherein the upper end preferably merges into two side walls, so that the transition between the side walls and the upper end is at least doubly curved.

The characteristic of the internal curvature or the configuration of the shape with more than one curvature or angle in the upper end is not subject to any particular limitation and can be adapted to other designs. For example, it may be provided that the height of the inner curvature is preferably in the range from 1 to 30 mm, particularly preferably in the range from 2 to 15 mm and especially preferably in the range from 3 to 10 mm. The height of the internal curvature is the distance between the highest point of the top end and the lowest point of the top end between the side walls.

It may further be provided that the distance between the discharge opening of the diverting unit, preferably the recess, and the nearest point of the internal curvature to which the diverting unit preferentially directs the gas stream is preferably in the range of 0.8 to 25 mm, particularly preferably in the range of 1.5 to 20 mm and especially preferably in the range of 2 to 10 mm.

The embodiment described above and below with two or more partial separating openings is particularly preferable as compared to other designs, wherein it was surprisingly found that the amount of liquid carried along by the gas can be kept very low. This improvement applies in particular to very different liquid components in the solvent mixture, which is used for chromatography. This embodiment is therefore particularly suitable for gradient chromatographies in which the proportions of the solvent liquid at room temperature and normal pressure and of the fluid which is gaseous at room temperature and normal pressure vary greatly, as described in detail above and below.

The preferred characteristics of the gas-liquid separator described above require a definition of the different areas that are in fluid contact with each other, as the mixture of gas and liquid phase is transferred by the separating region to the dividing region where the liquid is divided from the gas phase and the gas is transferred to the gas discharge region. The separating opening forms the division between the separating region and the dividing region, wherein the plane on which the separating opening ends marks the transition to the dividing region.

The transition between the dividing region and the gas discharge region is also marked by an opening, which is, however, relatively large compared to the separating opening. This opening is defined by the plane arranged at the level of the separating opening and perpendicular to the direction of the gas stream direction of the gas-liquid mixture in the separating region or parallel to the stream direction of the gas phase as soon as the separating opening passes from the separating region into the dividing region or is parallel to the liquid level during operation. The plane defined by the extension of the opening is selected to constitute the minimum surface between the dividing region and the gas discharge region, said plane contacting the separating opening and being substantially parallel to the bottom of the dividing region or, during operation, parallel to the liquid level.

It may further be provided that the ratio of the entry surface of the inlet provided in the separating region to the distance between the inlet and the baffle unit is in the range from 5:1 $mm^2$/mm to 1:10 $mm^2$/mm, preferably 2:1 $mm^2$/mm to 1:5 $mm^2$/mm.

The gas-liquid separator of the present invention can be manufactured from any known material as long as the requirements specified by the solvents and the physical conditions are met. Preferably, a transparent material can be used, through which the division process is visible, so that a quick error analysis is possible in case of coating formation or the like.

The gas-liquid separator may preferably be made of metals which are preferably acid and base resistant, mineral glasses and/or plastics such as fluoropolymers, polyetheretherketone (PEEK) or similar materials which are preferably solvent resistant.

The gas-liquid separator preferably has a volume in the range from 20 ml to 100 ml, particularly preferably in the range from 20 ml to 70 ml, especially preferably in the range from 20 ml to 50 ml. In a substantially cuboid shape, which can be formed, for example, in the upper and/or lower region of the gas-liquid separator, which is determined through the inlet nozzle or through the liquid outlet, in an arcuate manner or as a dome, the height of the gas-liquid separator preferably lies in the range from 8 cm to 150 cm, particularly preferably in the range from 10 cm to 12 cm, wherein the height is determined by the longitudinal extension in the gas stream direction, as by the inlet nozzle in the direction of the liquid outlet. The width and depth of the gas-liquid separator are preferably in the range from 15 mm to 60 mm, particularly preferably in the range from 15 mm to 25 mm.

Preferably, it can be provided that the gas-liquid separator is not circularly cylindrical, preferably having a substantially cuboid basic structure which has an upper and a lower arcuate cover.

The construction and manufacture of a gas-liquid separator according to the invention can be carried out in any way. According to a preferred embodiment, the gas-liquid separator can be configured to be dismantled so that individual components can be assembled and disassembled. This makes it easy to clean the gas-liquid separator in the event of soiling. For example, a substantially cuboid basic body with a suitable recess can be produced on which a cover can be placed via a screw connection serving as side wall. The side wall serving as a cover can assume the function of the baffle unit and/or as part of the gas distribution unit, as described above. A further part of the gas distribution unit, which preferably further constitutes a side wall of the gas discharge region, can be fastened in this embodiment into the substantially cuboid base body with a suitable recess by a positive fit, by welding, preferably laser welding, bonding or the like, so that the regions described above, in particular at least one separating region, at least one dividing region and at least one gas discharge region are formed. A gas-liquid separator is preferably produced by machining, preferably milling, of a block of material that is preferably made of plastic. Preferably, a side wall is formed by a cover plate, which is connected to the milled material block by pressure created by, for example, screwing. By simply removing the screws and the cover plate, the gas-liquid separator can be reliably cleaned as described above and below.

The gas-liquid separator can generally be operated at atmospheric pressure. However, in order to avoid the accumulation of larger quantities of liquid, e.g. methanol, the gas-liquid separator can be operated by a back-pressure regulator at a moderate internal back-pressure of, for example, 0.1 bar to 4 bar. Accordingly, it may be provided that the chromatography system is equipped with a back-pressure regulator downstream of the gas outlet, which is preferably adjustable in the range from 1 bar to 4 bar gauge pressure (absolute pressure 2 bar to 5 bar), preferably 2 bar to 3 bar gauge pressure. However, the liquid component collected across the dividing region and provided through the liquid outlet channel allows automated fractionation that can be operated at atmospheric pressure. Using the gas-liquid separator, and comparably to conventional HPLC analysis, a fully automatic fraction collection can also be realized for SFC analysis.

Since the inner walls and components of the gas-liquid separator are substantially permanently humidified in the dividing region, not only a self-cleaning effect can develop, but also a relatively low degree of cross-contamination of samples can be achieved. As a further advantage, the gas-liquid separator induces a relatively small peak widening in the resulting chromatograms.

According to another aspect, a conversion kit is also provided to convert a high-performance liquid chromatography (HPLC) system into an SFC system. Such a kit comprises at least one gas-liquid separator as described above. Preferably, the kit contains additional components, as described below, to convert an HPLC system into an SFC system, such as heat exchangers or back-pressure regulators.

The gas-liquid separator is used in particular in chromatography systems configured for supercritical liquid chromatography.

Such a system is operated by way of example using supercritical $CO_2$ together with a solvent, for example methanol. Accordingly, a chromatography system configured for supercritical liquid chromatography has at least one storage tank for the solvent and one storage tank for the supercritical fluid, such as $CO_2$. In general, the fluid is removed from the storage tank and transferred by at least one pump into the mixing element, which is in fluid connection with a chromatography column. The pumps and/or the mixing element as well as the chromatography column can be provided with a temperature control in order to be able to set a given temperature in each case. In particular, heat exchangers can be provided for this purpose. The addition of mixtures to be separated, in particular substances to be purified, can be carried out by known devices, such as injectors, which are preferably provided in the line in which the solvent is fed to the mixing element.

The fluid exiting the chromatography column is preferably fed at least partially to a detection or analysis unit. Examples of a detection or analysis unit are, among others, UV detectors and/or mass spectrometers.

After the chromatography column and preferably after the detection or analysis unit, a back-pressure regulator and preferably a heat exchanger after the back-pressure regulator are generally provided. The aerosol exiting the heat exchanger is preferably subsequently fed to a gas-liquid separator according to the invention.

Depending on the type of gas, the gas phase of the aerosol can be captured and processed or, for example when $CO_2$ is used, released into the environment.

The liquid phase of the aerosol is preferably collected in a fraction collector. The collected fractions are particularly preferably collected automatically as main fractions, while excess solvent can be subjected to treatment or disposal. The connecting line between the liquid outlet of the gas-liquid separator and the fraction collector can preferably be configured in such a way that residues of the gas phase, preferably $CO_2$ residue, can escape via this connection. A semi-permeable plastic material can be used for this, for example Teflon, particularly preferably AF 2400 (commercially available from DuPont).

The SFC chromatography system is preferably operable with a volume stream in the range from 10 ml/min to 450 ml/min, particularly preferably in the range from 50 ml/min to 300 ml/min and especially preferably 100 ml/min to 250 ml/min. It may further be provided that the SFC chromatography system is operable preferably at a volume stream of at least 10 ml/min, particularly preferably at least 50 ml/min and especially preferably at least 100 ml/min.

A further subject of the present invention is a method for the division of a gas-liquid mixture in which a gas-liquid separator according to the invention or a chromatography system with a gas-liquid separator according to the invention is used.

To carry out a division with a supercritical fluid, a gas is preferably used which can relatively easily be put into a supercritical state. Among the preferred gases that have these properties are carbon dioxide ($CO_2$), ammonia ($NH_3$), freon, xenon, wherein carbon dioxide ($CO_2$) is particularly preferable.

It may further be provided that an inorganic or organic solvent which is liquid under normal division conditions, in particular at 25° C. and atmospheric pressure (1023 mbar), is used in a method according to the invention. A polar or non-polar solvent may be used, depending on the type of compounds to be divided or purified.

It may be preferably provided that the gas-liquid mixture to be brought into the supercritical state comprises a polar solvent and a gas selected from the group consisting of $CO_2$, $NH_3$, Freon, Xenon, preferably $CO_2$. Preferably the polar solvent is an alcohol, preferably methanol, ethanol or propanol, hexane, mixtures with dichloromethane, chloroform, water (preferably up to max. 3% by volume, since otherwise a gap in the mixture may occur), an aldehyde or a ketone, preferably methyl ethyl ketone; an ester, preferably ethyl acetic ester; or an ether, preferably tetrahydrofuran.

When using a polar solvent, it may preferably be provided that the baffle unit has a surface region with a surface energy in the range of 35 mN/m to 100 mN/m, particularly preferably in the range of 50 mN/m to 80 mN/m.

It may further be provided that the gas-liquid mixture to be brought into the supercritical state comprises a non-polar solvent and a gas selected from the group consisting of $CO_2$, $NH_3$, Freon, Xenon, preferably $CO_2$. Preferably the non-polar solvent is an aliphatic hydrocarbon, preferably hexane, cyclohexane, heptane, octane; an aromatic hydrocarbon, preferably benzene, toluene, xylene; an ester, preferably ethyl acetate; or an ether, preferably tetrahydrofuran.

When using a non-polar solvent, it may preferably be provided that the baffle unit has a surface region with a surface energy in the range from 10 mN/m to 40 mN/m, particularly preferably in the range from 15 mN/m to 30 mN/m.

In a preferred embodiment of the method, in which the chromatography system comprises a back-pressure regulator by means of which the pressure in the gas-liquid separator can be regulated, it may be provided that the regulation of the pressure is selected as a function of the solvent content of the gas-liquid mixture, wherein preferably the regulation may be configured such that a high pressure is provided in the gas-liquid separator at a high solvent content.

BRIEF DESCRIPTION OF THE DRAWINGS

In the following, preferred embodiments of the present invention are described by way of example using drawing figures, without a limitation of the invention being thereby intended. Therein.

DETAILED DESCRIPTION OF THE DRAWINGS

Figure 1:
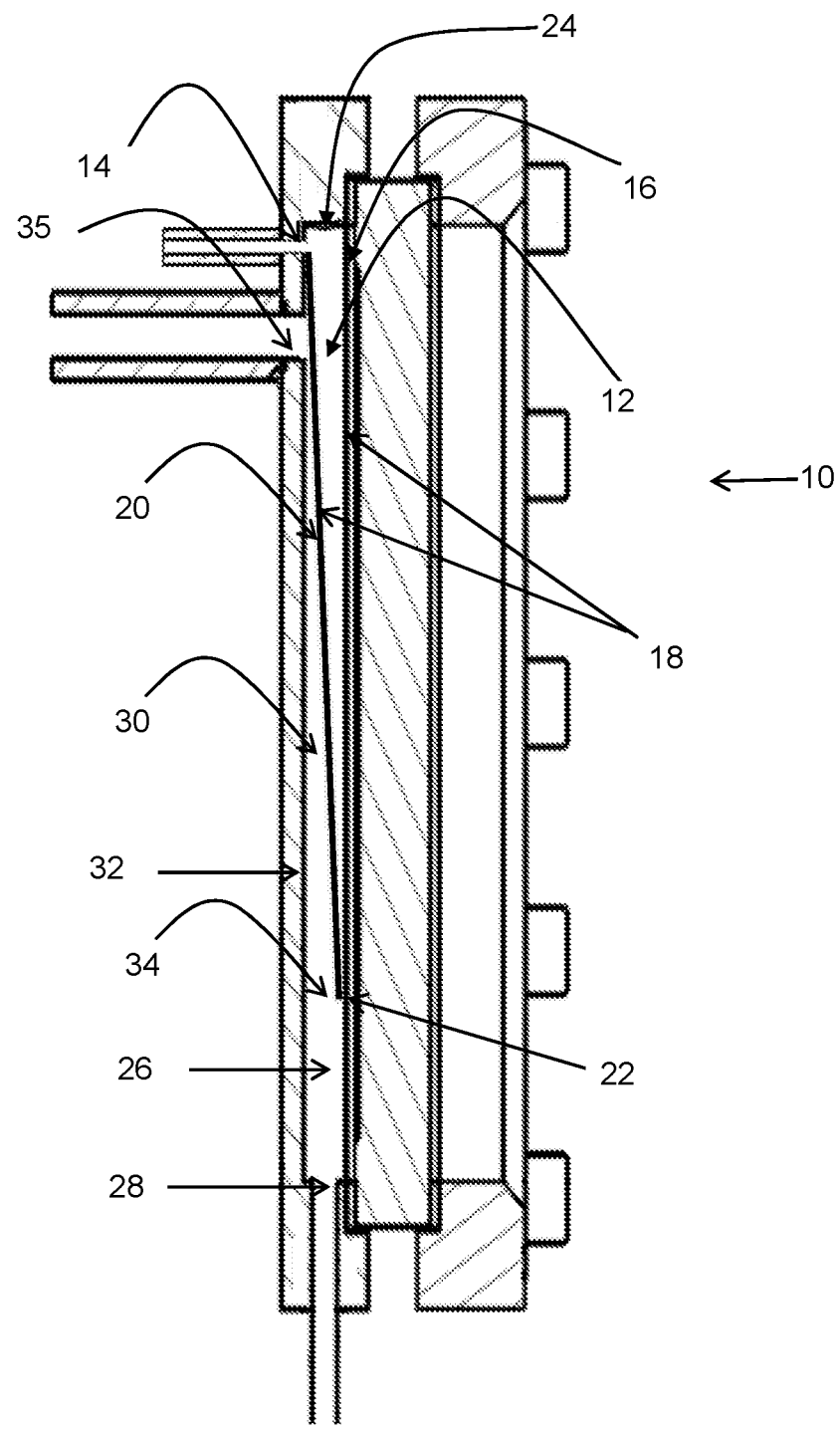
FIG. 1 shows a schematic longitudinal sectional view of a gas-liquid separator according to the invention.

FIG. 1 describes a gas-liquid separator 10 according to the invention in a longitudinal sectional view.

The gas-liquid separator 10 comprises a separating region 12 having an inlet nozzle 14, a baffle unit 16 and a gas distribution unit 18. The gas distribution unit 18 is formed by the baffle unit 16 of a gas acceleration plate 20, which is configured herein as a baffle plate, as well as two further side walls, which are not shown in the longitudinal section. In particular, the wedge-shaped shape of the separating region 12 is shown, through which a gas is accelerated from the region of the inlet nozzle 14 to the separating opening 22.

The baffle unit 16 configured herein as a baffle plate can have a structured or smooth surface. The gas acceleration plate 20 may be flat or slightly concavely curved from the inlet nozzle 14 in the direction of the separating opening 22 so as to reduce the apparent decrease in the distance between the baffle plate 16 and the gas acceleration plate 20. The separating region 12 is capped by an upper end 24.

The gas-liquid separator 10 comprises a dividing region 26 having a liquid outlet 28, wherein the dividing region 26 is connected to the separating region 12 by the separating opening 22, so that the separating region 12 is in fluid contact with the dividing region 26.

The baffle unit 16 configured herein as a baffle plate forms a side wall of the dividing region 26. The bottom of the gas-liquid separator 10 is formed by the lower end of the dividing region 26. This bottom can be configured such that the liquid outlet 28 is provided at the lowest point of the bottom.

A side wall 32 of the gas discharge region 30 and the two side walls not shown in the longitudinal section together with an opening 34 provided between the gas discharge region 30 and the dividing region 26 and the separating opening 22 form the further boundaries of the dividing region.

In the dividing region 26, the gas phase is divided from the liquid phase, wherein the gas is preferably accelerated by the gas distribution unit 18 in the direction of the separating opening 22, so that the liquid is transferred in the direction of the bottom of the dividing region 26.

The gas phase is led through the opening 34, which is provided between the gas discharge region 30 and the dividing region 26, into the gas discharge region 30. The gas discharge region 30 is configured herein in such a way that the gas is accelerated in the direction of the gas outlet 35, which is provided in the gas discharge region 30.

In this case, the rear wall of the gas acceleration plate 20 described above together with the side wall 32 projecting into the dividing region forms a corresponding wedge shape, wherein one edge of the gas acceleration plate 20 is connected to the side wall 32.

Figure 2:
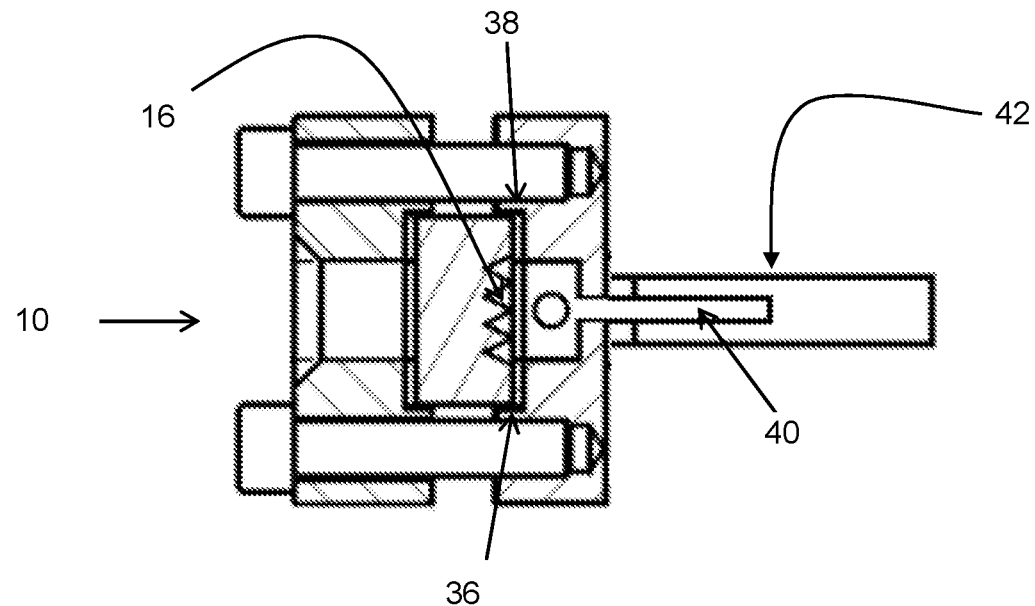
FIG. 2 shows a schematic cross-sectional view of a gas-liquid separator according to the invention.

FIG. 2 shows a schematic cross-sectional view of a gas-liquid separator 10 according to the invention, wherein identical reference signs describe identical parts.

In particular, the side walls 36, 38 of the gas-liquid separator 10, which were not shown before, are visible. Furthermore, the aerosol supply line 40 and the gas discharge line 42 are shown.

Furthermore, it can be seen that in this configuration the baffle unit 16, which is configured as an impact plate, has a groove-shaped surface structure.

Figure 3:
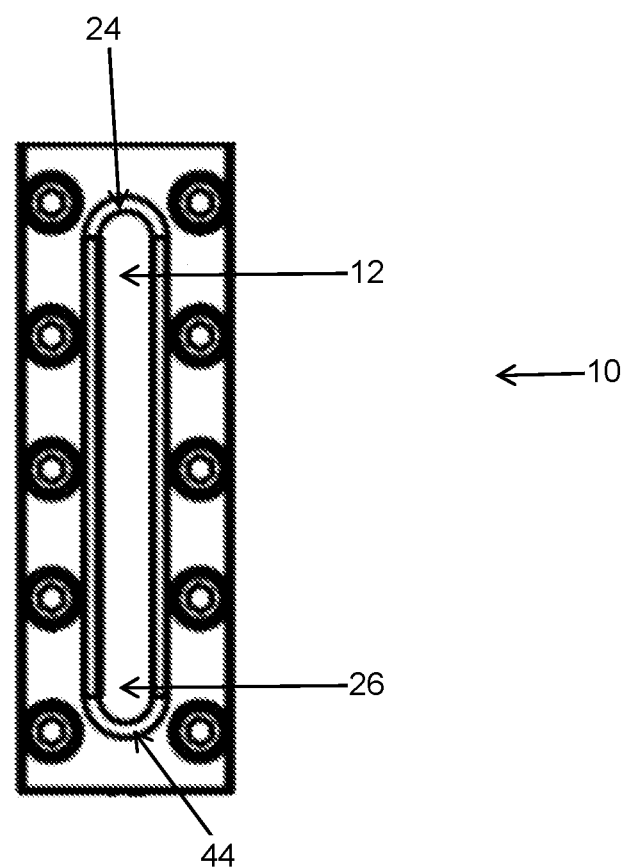
FIG. 3 shows a schematic view of a gas-liquid separator according to the invention.

FIG. 3 shows a schematic view of a gas-liquid separator 10 according to the invention, wherein identical reference signs describe identical parts. In particular, the preferred configuration of the lower end 44 of the dividing region 26 and the upper end 24 of separating region 12 is evident, each of which has an arc-shaped design.

Figure 4:
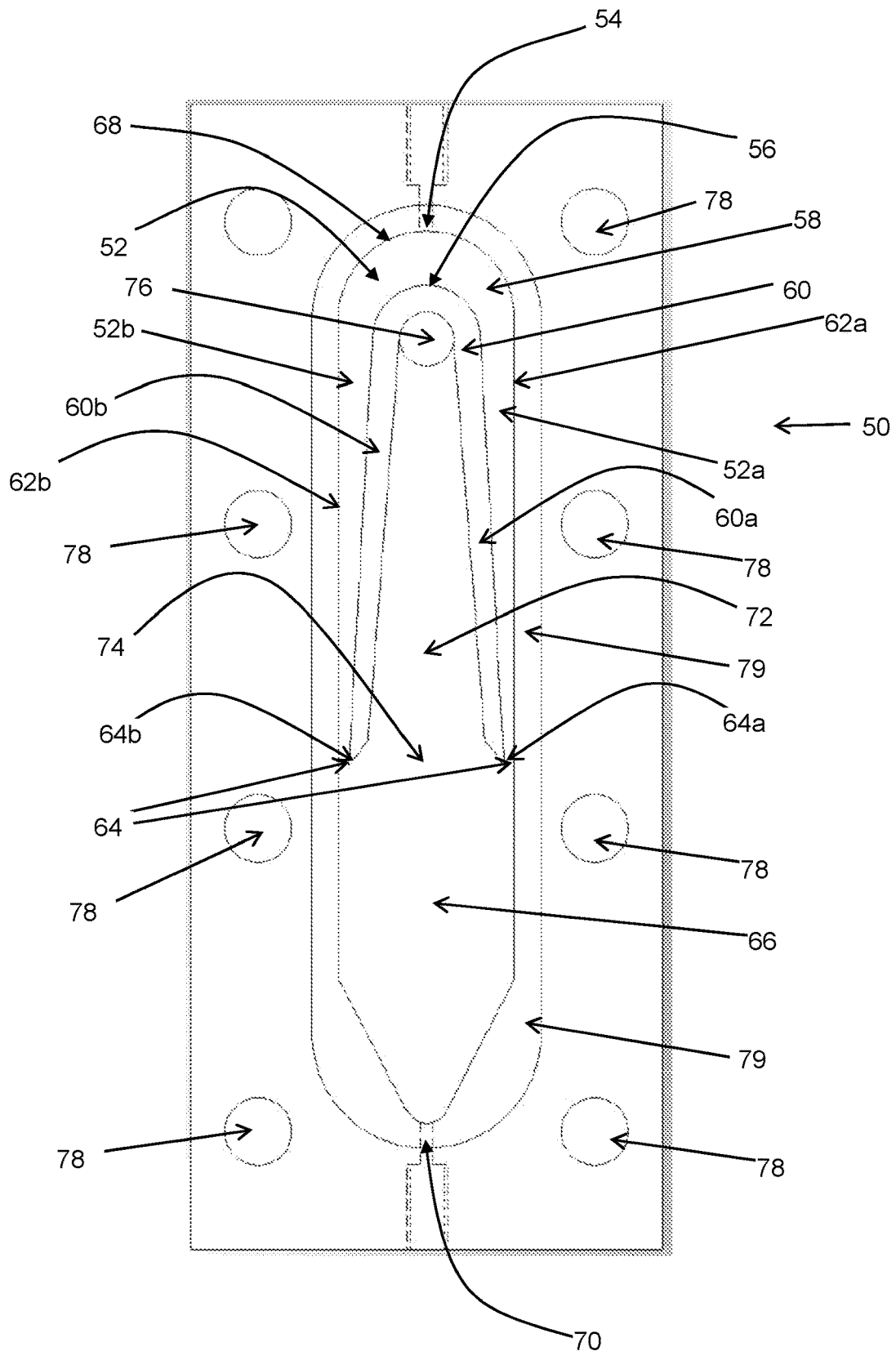
FIG. 4 shows a schematic longitudinal representation of a further embodiment of a gas-liquid separator according to the invention.

FIG. 4 describes a gas-liquid separator 50 according to the invention in a longitudinal sectional view.

The gas-liquid separator 50 comprises a separating region 52 having an inlet nozzle 54, a baffle unit 56 and a gas distribution unit 58. The gas distribution unit 58 is formed by a gas acceleration unit 60, two side walls 62a, 62b, and another bottom wall and a top wall, which are not shown in the longitudinal section. In particular, the wedge-shaped shape of the separating region 52 is shown, through which a gas is accelerated from the region of the inlet nozzle 54 to the separating opening 64.

In the present embodiment, the separating region 52 is divided into two subregions 52a, 52b, each of which is connected to dividing region 66 via its own partial separating openings 64a and 64b.

In the present embodiment, the baffle unit 56 is formed in the region of the gas acceleration unit 60, which at this point connects the two subregions 60a, 60b of the gas acceleration unit 60 in an arc and partially divides the subregions 52a, 52b of the separating region 52. The inlet nozzle 54 directs the gas-liquid mixture onto the baffle unit 56. This creates a gas stream that runs parallel to the stream direction of the liquid in the separating region 52. Herein, the gas acceleration unit 60 has two subregions 60a, 60b which lead from the inlet nozzle 54 in the direction of the separating opening 64 to a reduction of the distance between the gas acceleration unit 60 and the respective side wall 62a, 62b, wherein the subregions 60a, 60b of the gas acceleration unit 60 can be flat or slightly concavely curved. The separating region 52 is capped by an upper end 68.

The gas-liquid separator 50 comprises a dividing region 66 having a liquid outlet 70, wherein the dividing region 66 is connected to the separating region 52 by the separating opening 64 and the two partial separating openings 64a and 64b respectively, so that the two subregions 52a, 52b of the separating region 52 are in fluid contact with the dividing region 66.

The bottom of the gas-liquid separator 50 is formed by the lower end of the dividing region 66. This bottom can be configured such that the liquid outlet 70 is provided at the lowest point of the bottom.

The gas discharge region 72 is formed by the gas acceleration unit 60 and the two walls not shown in the longitudinal section together with an opening 74 provided between the gas discharge region 72 and the dividing region 66.

In the dividing region 66, the gas phase is divided from the liquid phase, wherein the gas is preferably accelerated by the gas distribution unit 58 in the direction of the separating opening 64, so that the liquid is transferred in the direction of the bottom of the dividing region 66. In the present embodiment, the two partial gas streams are led through the partial separating openings 52a, 52b into the dividing region 66 and are directed against each other so that their velocity in the dividing region is minimized. Through this configuration, the amount of liquid entrained in the gas stream can be greatly reduced.

The gas phase is led through the opening 74, which is provided between the gas discharge region 72 and the dividing region 66, into the gas discharge region 72. The gas discharge region 72 is configured herein in such a way that the gas is accelerated in the direction of the gas outlet 76, which is provided in the gas discharge region 72.

In this case, the rear side of the gas acceleration unit 60 described above forms a corresponding shape that narrows upwards.

The embodiment shown in FIG. 4 can be very easily manufactured by milling from a plastic block. In this case, the rear wall not shown in FIG. 4 can be manufactured by leaving the material intact, wherein the volumes of the previously described regions and subregions can be maintained by corresponding milling depths or depths of material removal. The upper side can be provided by a plate, for example a glass plate, which is pressed from above against the milled plastic block. Pressing can, for example, be achieved by means of a screw connection. The corresponding bores are indicated by the reference sign 78. The plate forming the top is preferably fixed by a recess provided in steps over the regions and subregions set out, which can be regarded as a groove. This step-shaped recess is indicated herein by the reference sign 79.

Figure 5:
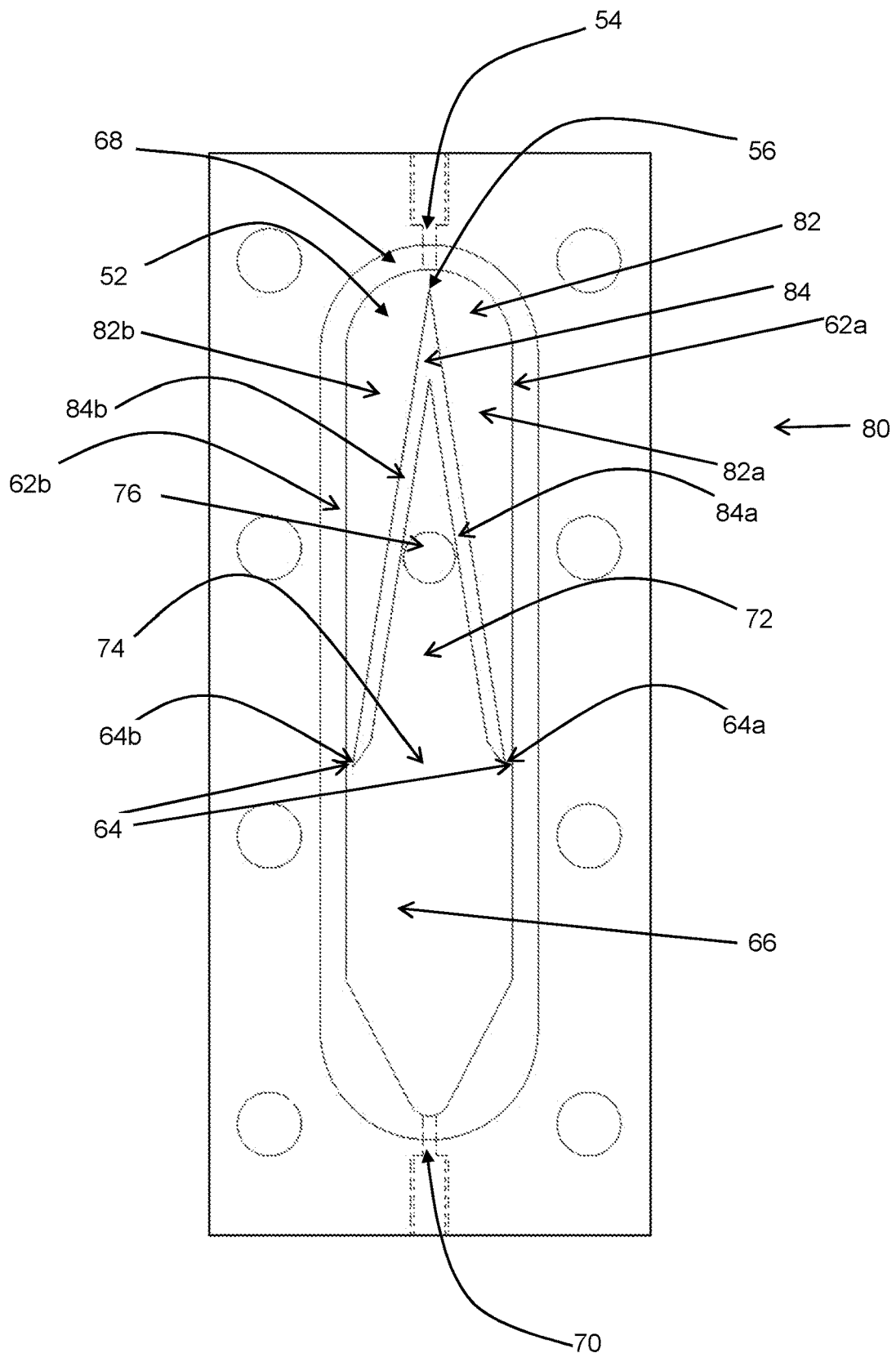
FIG. 5 shows a schematic longitudinal sectional view of a further embodiment of a gas-liquid separator according to the invention.

FIG. 5 describes a gas-liquid separator 80 according to the invention in a longitudinal sectional view. The conceptual construction of the gas-liquid separator 80 shown in FIG. 5 corresponds to the gas-liquid separator 50 shown in FIG. 4, wherein identical or similar components have the same reference signs. The gas-liquid separator 80 comprises a separating region 52 having an inlet nozzle 54, a baffle unit 56 and a gas distribution unit 82. The gas distribution unit 82 is formed by a gas acceleration unit 84, two side walls 62a, 62b, and another bottom wall and a top wall, which are not shown in the longitudinal section.

The substantial difference is in particular that the gas acceleration unit 84 divides itself sharply into two subregions 88a and 88b, in contrast to the gas acceleration unit 60 of the configuration shown in FIG. 4, which is formed to be curved in the impact region. In this case, the nozzle is directed onto the impact region 56, which can be formed to be relatively flat so that the joint between the two subregions 84a and 84b is flattened.

Figure 6:
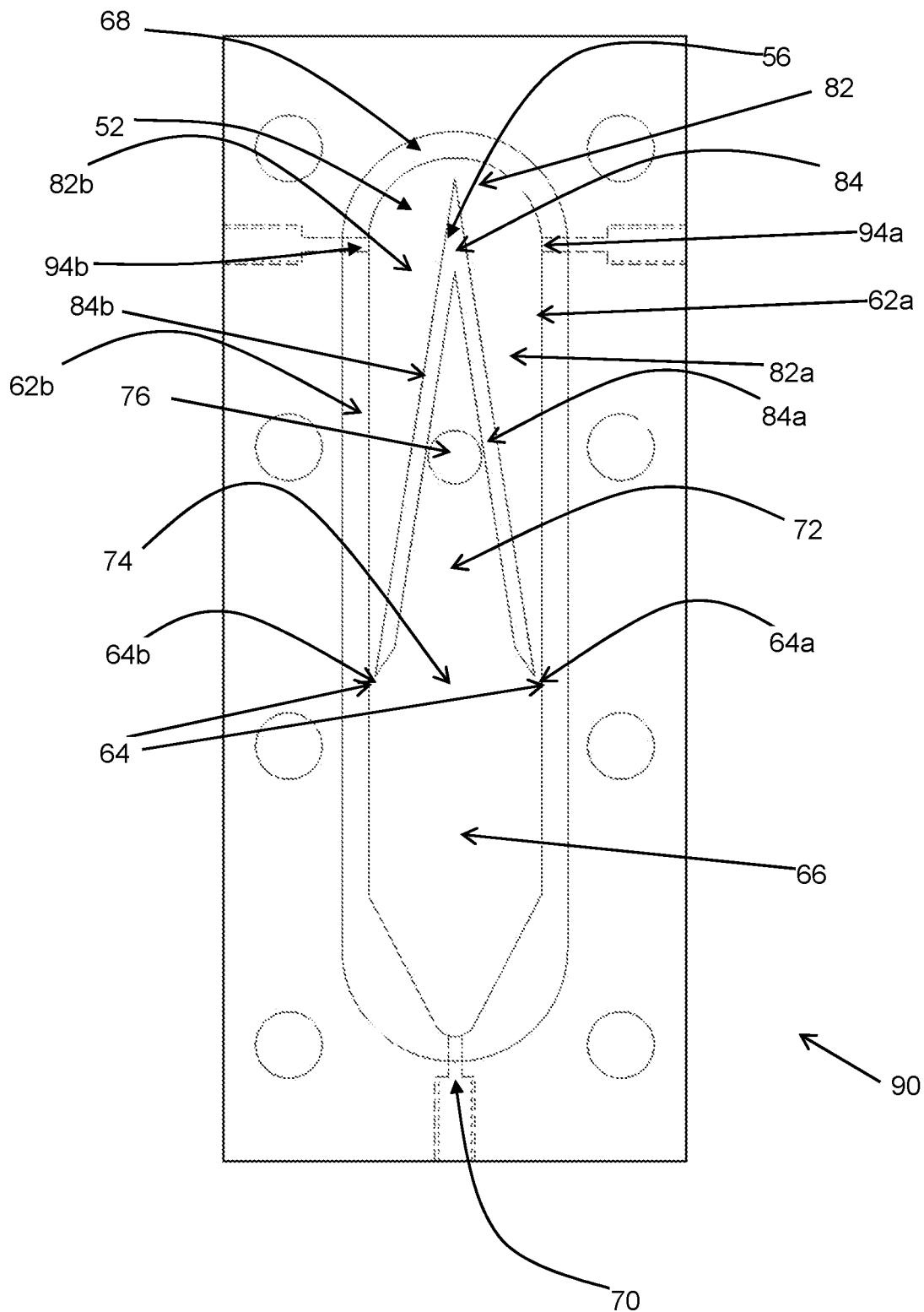
FIG. 6 shows a schematic longitudinal sectional view of a further embodiment of a gas-liquid separator according to the invention

FIG. 6 describes a gas-liquid separator 90 according to the invention in a longitudinal sectional view. The conceptual construction of the gas-liquid separator 90 shown in FIG. 6 corresponds to the gas-liquid separator 80 shown in FIG. 5, wherein identical or similar components have the same reference signs. The gas-liquid separator 90 comprises a separating region 52 with two inlet nozzles 94a, 94b, a baffle unit 56 and a gas distribution unit 82.

The substantial difference is in particular that the two inlet nozzles 94a, 94b direct the aerosol onto the gas distribution unit 82 from two sides or onto the two subregions 82a, 82b of the gas distribution unit 82. It is apparent to the person skilled in the art that the gas distribution unit 82 could be separated at the upper end 68 by a dividing wall into two actually divided separating regions without there being any substantial changes in the stream in the dividing region.

Figure 7:
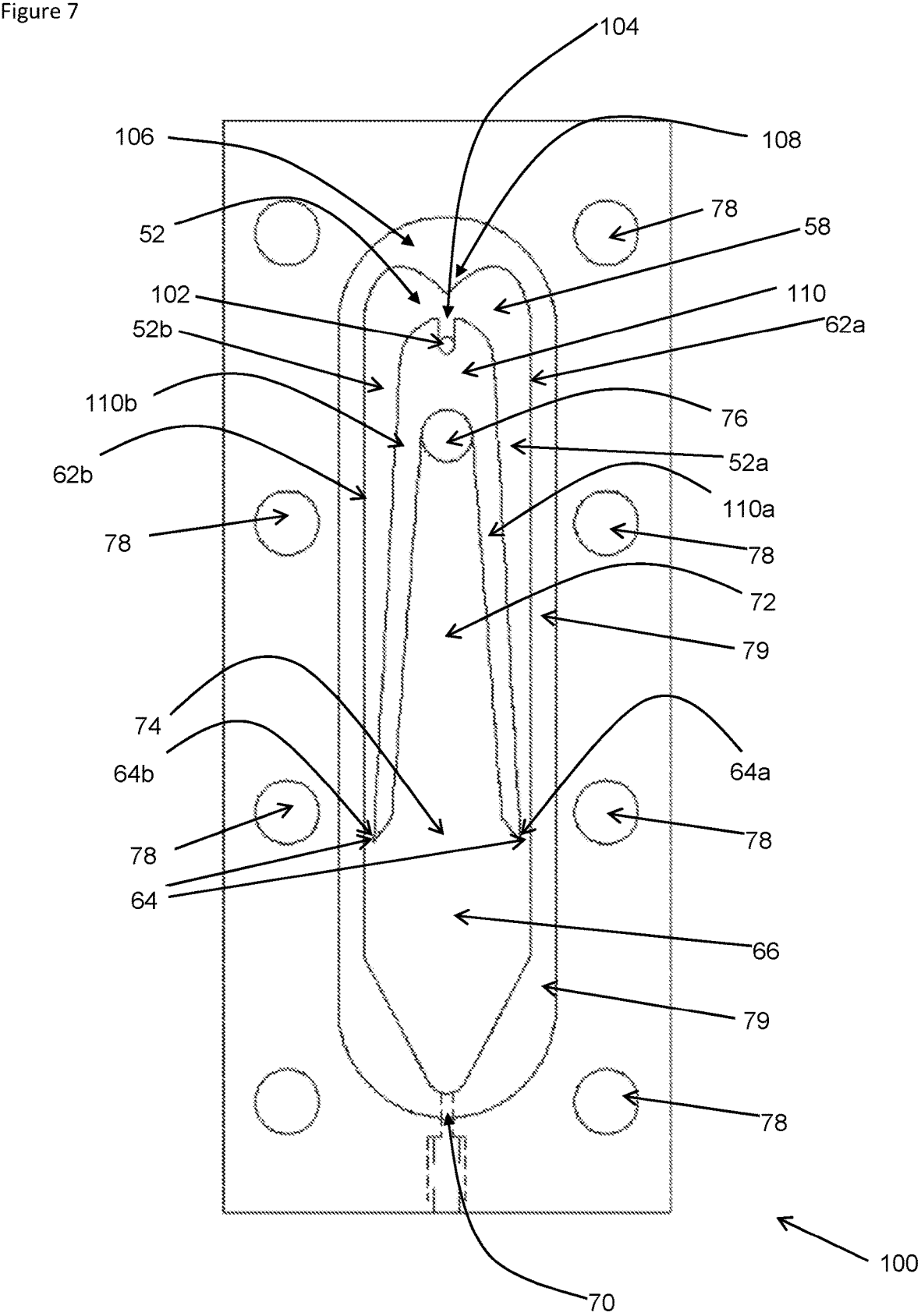
FIG. 7 shows a schematic longitudinal sectional view of a further embodiment of a gas-liquid separator according to the invention.

FIG. 7 describes a gas-liquid separator 100 according to the invention in a longitudinal sectional view. The conceptual construction of the gas-liquid separator 100 shown in FIG. 7 corresponds to the gas-liquid separator 50 shown in FIG. 4, wherein identical or similar components have the same reference signs. The gas-liquid separator 100 comprises a separating region 52 having an inlet nozzle 102 and a gas distribution unit 58. In its present form, the baffle unit is formed by the top wall, which is not shown in FIG. 7.

The substantial difference is in particular that the baffle unit is formed by the top wall which is not shown, wherein the baffle unit is first directed through the inlet nozzle 102 into the gas-liquid separator 100 onto the top wall. The diverting unit 104 directs the gas stream to the upper end 106, which has an inner curvature 108 in the present embodiment. The diverting unit 104 is formed by a recess from the gas acceleration unit 110, which at this point connects the two subregions 110a, 110b of the gas acceleration unit 110 in an arc and partially divides the subregions 52a, 52b of the separating region 52.

Accordingly, the upper end 106, in particular the region of the inner curvature 108, can be regarded as a second baffle unit since part of the aerosol undergoes further impact separation. The inner curvature 108 stabilizes the gas stream, so that the aerosol or gas stream is directed to the two subregions 52a and 52b of the gas distribution unit.

Figure 8:
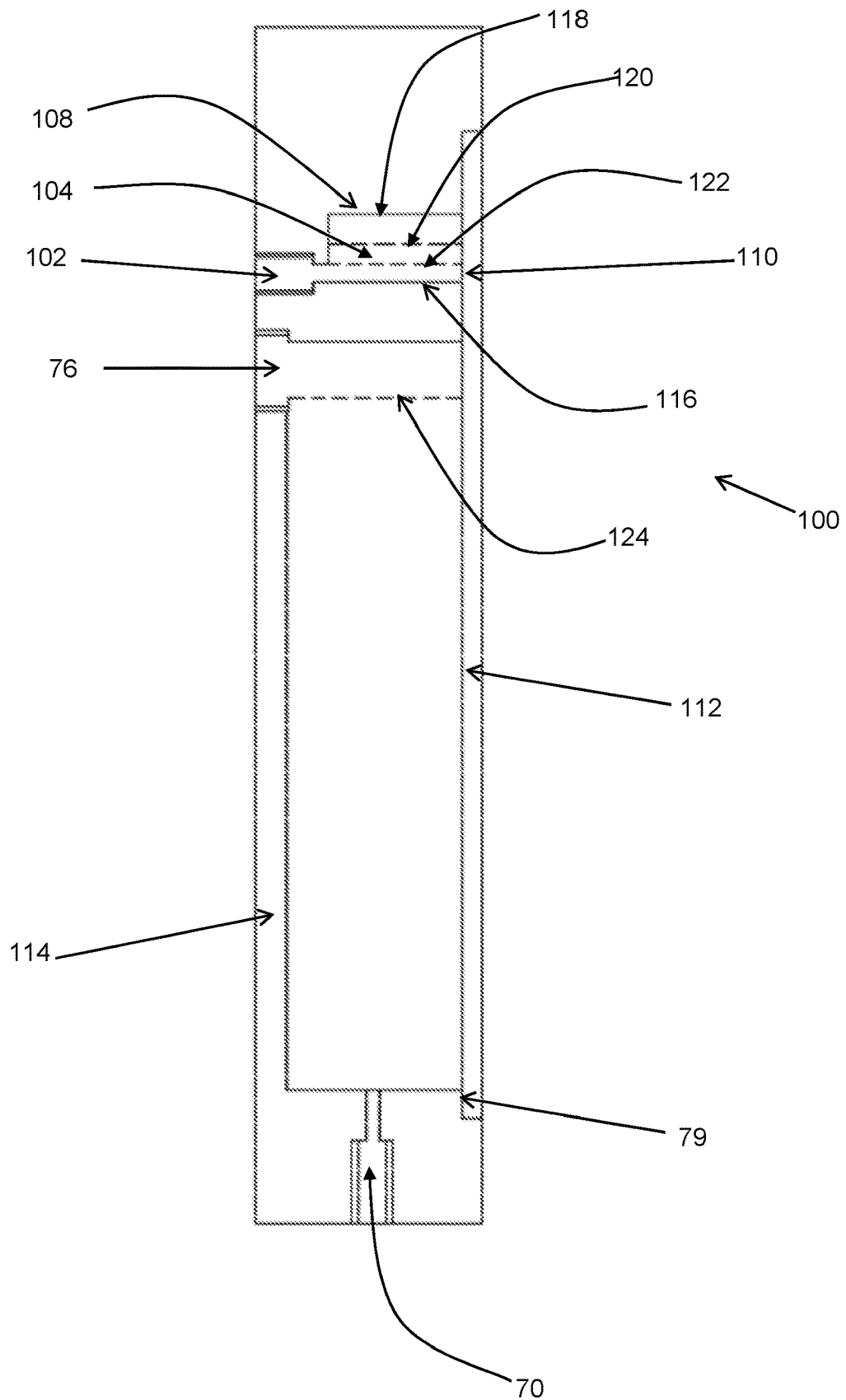
FIG. 8 shows a schematic longitudinal sectional view of the embodiment of a gas-liquid separator according to the invention as shown in FIG. 7, wherein the sectional plane is rotated by 90° with respect to the sectional plane shown in FIG. 7.

FIG. 8 shows a longitudinal view of the gas-liquid separator 100 described in FIG. 7, wherein a sectional plane is shown which is perpendicular to the view shown in FIG. 7. The plane shown shows a section through the tip of the inner curvature 108 and the liquid outlet 70. In particular, the top wall 112 and the bottom wall 114 are shown. The line 116 represents the bottom region of the diverting unit 104 and the line 118 represents the tip of the inner curvature 108. The dashed lines 120, 122 indicate the material milled slots which form the diverting unit 104, while the dashed line 124 indicates the upper region of the gas discharge region 72, wherein, at this point, the gas is collected and transferred to the gas outlet 76.

Figure 9:
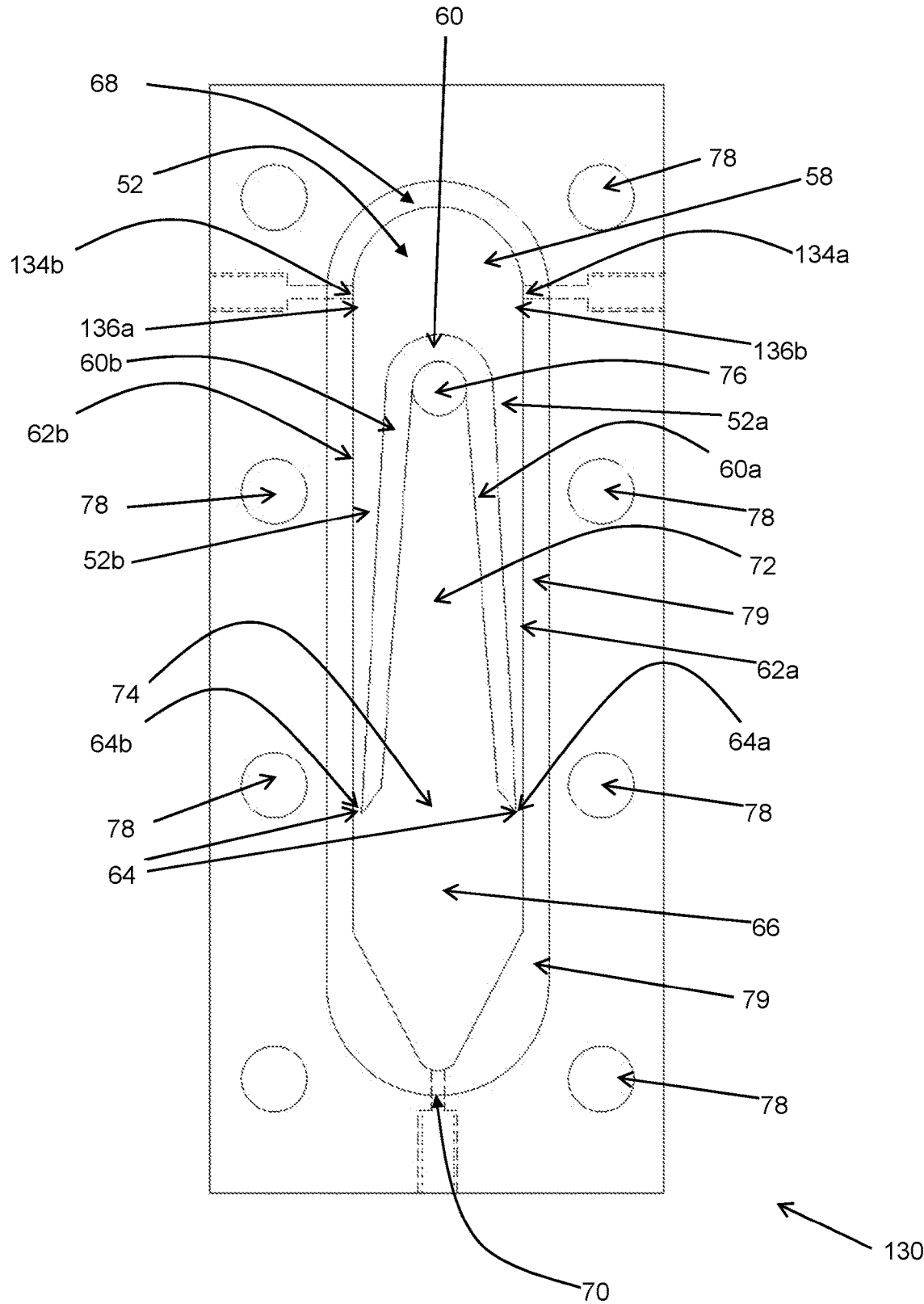
FIG. 9 shows a schematic longitudinal sectional view of a further embodiment of a gas-liquid separator according to the invention.

FIG. 9 describes a gas-liquid separator 130 according to the invention in a longitudinal sectional view. The conceptual construction of the gas-liquid separator 130 shown in FIG. 9 corresponds to the gas-liquid separator 50 shown in FIG. 4, wherein identical or similar components have the same reference signs. The gas-liquid separator 130 comprises a separating region 52 with two inlet nozzles 134a, 134b, two baffle units 136a, 136b and a gas distribution unit 52.

The substantial difference is in particular that the two inlet nozzles 134a, 134b direct the aerosol onto the opposite sides of the respective side walls 62a, 62b, which are formed at the respective points as baffle units 136a, 136b, wherein the jet of the inlet nozzles 134a is directed onto the baffle unit 136a, which can be regarded as part of the side wall 62b. In this case, the two inlet nozzles 134a, 134b can be easily slightly moved in a horizontal or vertical direction.

The embodiments shown in FIGS. 5 to 9 may, as previously shown for FIG. 4, be produced by milling from a plastic block, with the top being provided by a plate, such as a glass plate, which is pressed from above against the milled plastic block. Furthermore, all embodiments can be provided by casting or similar methods.

Figure 10:
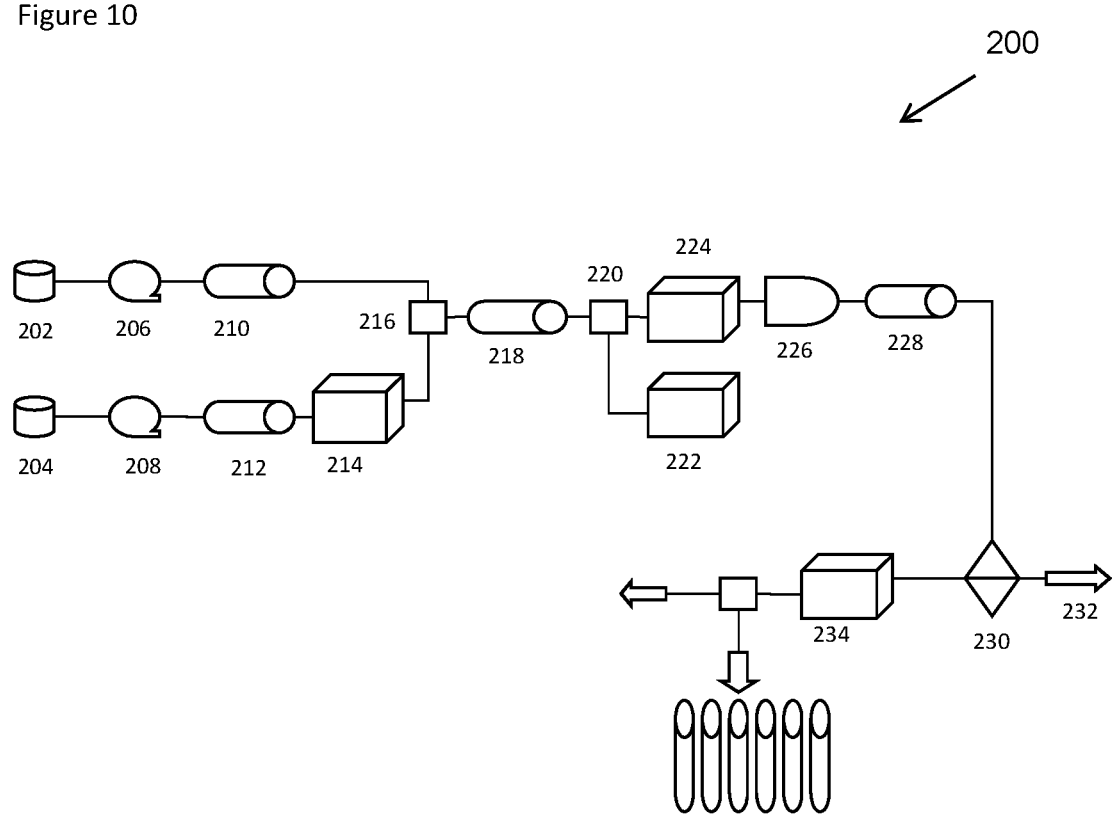
FIG. 10 shows a schematic view of a chromatography system with a gas-liquid separator according to the invention.

FIG. 10 shows a schematic view of a chromatography system 200 with a gas-liquid separator 230 according to the invention, which is suitable for supercritical liquid chromatography.

Such a system is described by way of example using supercritical $CO_2$, wherein methanol is shown as an exemplary solvent. Of course, systems in which other solvents, preferably organic solvents, or other supercritical fluids are used, are similarly constructed.

As shown in FIG. 9, the respective fluids are stored in storage tanks, in particular the gas which is further used in a supercritical state is provided in a storage tank 202 and the solvent in a storage tank 204, each of which can be conveyed from the storage tanks 202, 204 by a pump 206, 208 to become the further components of the system. In the System 200 described here, a preparation stage 210, 212 is preferably provided in each fluid supply line, via which the liquids can be tempered. It is further possible to level the pressure fluctuations indicated by the pumps. Accordingly, this preparation stage can, for example, be formed as a heat exchanger or pump. An addition unit 214 may preferably be provided in the solvent line, for example an injector via which a mixture to be separated is introduced into the system 200 before the $CO_2$ and the solvent are fed into a mixer 216 and from this into a chromatography column 218.

In this system 200, two analysis units are connected downstream of the chromatography column 218, wherein a sample discharge unit 220 is connected to a mass spectrometer 222 for this purpose and a UV detector 224 is provided downstream of the sample discharge unit. The back-pressure regulator 226 provided in the line maintains the respective pressure necessary for the fluid to remain in a supercritical state. After the back-pressure regulator 226, a heat exchanger 228 is provided which prevents the aerosol from freezing during the expansion process. Subsequently, the aerosol is introduced into a 230 gas-liquid separator according to the invention, wherein the gas of the system is discharged via outlet 232.

The liquid is introduced into a fraction collector 234 and fractionated in the same. The solvent contained in the fractionated samples can be removed from the samples.

The features of the invention revealed in the above description, as well as the claims, figures and examples of execution, may be essential both individually and in any combination for the realization of the invention in its embodiments.

The invention claimed is:

1. A system comprising a supercritical fluid chromatography and a gas-liquid separator, wherein the gas-liquid separator comprises:
   (a) a separating region having an inlet nozzle, a baffle unit, and a gas distribution unit;
   (b) a dividing region having a liquid outlet; and
   (c) a gas discharge region having a gas outlet;
   wherein the separating region is connected to the dividing region by a separating opening and a distance of the inlet nozzle from the baffle unit is greater than a smallest longitudinal extension of the separating opening and the inlet nozzle is configured such that a gas-liquid stream directed through the inlet nozzle can act on the baffle unit,
   wherein the separating opening is configured such that a stream velocity of the gas in the dividing region is reduced,
   wherein the separating opening has two, three, four, or more partial separating openings, by arrangement of which a reduction in the stream velocity of the gas is effectible.

2. The system according to claim 1, wherein the separating region does not have a circular cross-sectional area in a region of the inlet nozzle.

3. The system according to claim 2, wherein the separating region comprises at least three side walls which, together with an upper end, define a space which is connected to the dividing region by the separating opening.

4. The system according to claim 1, wherein the gas-liquid separator is operable with a stream direction of the gas in the separating region which is substantially parallel to a stream direction of the liquid.

5. The system according to claim 1, wherein the gas-liquid separator has installations in the dividing region for reducing the gas stream.

6. The system according to claim 1, wherein the baffle unit has a curvature or bend.

7. The system according to claim 6, wherein said baffle unit forms a part of an upper end or a part of a gas acceleration unit.

8. The system according to claim 1, wherein a diverting unit is provided in the separating region, by which an aerosol stream can act on a second baffle unit.

9. The system according to claim 1, wherein the baffle unit has a surface region with a surface energy in the range from 15 mN/m to 120 mN/m.

10. The system according to claim 1, wherein a ratio of an entry surface of the inlet nozzle provided in the separating region to a volume of the separating region is in the range from 4:1 mm2/ml to 1:50 mm2/ml.

11. The system according to claim 1, wherein the separating region comprises at least two side walls defining, together with an upper end and a gas acceleration unit, a space forming the gas distribution unit, wherein one of the side walls, the gas acceleration unit, or the upper end is formed as a baffle unit, wherein said space is connected to the dividing region by the separating opening, and wherein a distance between two opposite side walls is greater than half a distance of the inlet nozzle from the baffle unit.

12. The system according to claim 11, wherein the separating region comprises at least three side walls defining, together with the upper end and the gas acceleration unit, a space forming the gas distribution unit, wherein one of the side walls, the gas acceleration unit, or the upper end is formed as a baffle unit, wherein said space is connected to the dividing region by the separating opening, and wherein the distance between two opposite side walls is greater than half a distance of the inlet nozzle from the baffle unit.

13. The system according to claim 1, wherein a ratio of an outlet surface of the separating opening to a volume of the gas-liquid separator is in the range from 0.05 mm2/ml to 6 mm2/ml.

14. The system according to claim 1, wherein the inlet nozzle is configured such that a gas-liquid stream directed through the inlet nozzle can act on the baffle unit.

15. The system according to claim 14, wherein an angle at which a gas-liquid stream directed through the inlet nozzle can act on the baffle unit is in the range from 50° to 130°.

16. A method of separating a gas-liquid mixture comprising using a system according to claim 1.

17. The system according to claim 1, wherein two baffle units are provided in the separating region, wherein the first baffle unit is arranged below the second baffle unit.

\* \* \* \* \*